United States Patent
Shin et al.

(10) Patent No.: US 12,366,993 B2
(45) Date of Patent: Jul. 22, 2025

(54) APPARATUS AND METHOD FOR IMPROVING DATA INPUT/OUTPUT PERFORMANCE OF STORAGE

(71) Applicant: SK hynix Inc., Gyeonggi-do (KR)

(72) Inventors: Hee Chan Shin, Gyeonggi-do (KR); Young Ho Ahn, Gyeonggi-do (KR); Gi Gyun Yoo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 96 days.

(21) Appl. No.: 17/828,443

(22) Filed: May 31, 2022

(65) Prior Publication Data

US 2023/0153032 A1    May 18, 2023

(30) Foreign Application Priority Data

Nov. 18, 2021    (KR) .......................... 10-2021-0159566

(51) Int. Cl.
  *G06F 3/06* (2006.01)
(52) U.S. Cl.
  CPC .......... *G06F 3/0659* (2013.01); *G06F 3/0619* (2013.01); *G06F 3/0679* (2013.01)
(58) Field of Classification Search
  CPC ...... G06F 3/0604; G06F 3/061; G06F 3/0611; G06F 3/0619; G06F 3/0626; G06F 3/0631; G06F 3/0644; G06F 3/0656; G06F 3/0658; G06F 3/0659; G06F 3/0679; G06F 12/10
  See application file for complete search history.

(56) References Cited

U.S. PATENT DOCUMENTS

| | | | |
|---|---|---|---|
| 2010/0070747 A1* | 3/2010 | Iyigun ................ | G06F 12/0866 707/E17.044 |
| 2013/0290607 A1* | 10/2013 | Chang ................ | G06F 12/0895 711/144 |
| 2015/0293984 A1* | 10/2015 | Zolotusky, Jr. ......... | G06F 3/065 707/634 |
| 2017/0242606 A1 | 8/2017 | Maiko et al. | |
| 2018/0089088 A1* | 3/2018 | Jakowski ............ | G06F 12/0804 |
| 2019/0130947 A1* | 5/2019 | Yoon .................. | G06F 12/0871 |
| 2021/0149797 A1 | 5/2021 | Kanno et al. | |
| 2021/0173588 A1 | 6/2021 | Kannan et al. | |
| 2021/0182190 A1 | 6/2021 | Gao et al. | |
| 2022/0269567 A1* | 8/2022 | Ebara ................ | G06F 11/1658 |
| 2023/0061994 A1* | 3/2023 | Li ........................ | G06F 3/0659 |

FOREIGN PATENT DOCUMENTS

JP    2014153873 A    *  8/2014

* cited by examiner

*Primary Examiner* — Aracelis Ruiz
(74) *Attorney, Agent, or Firm* — IP & T GROUP LLP

(57) ABSTRACT

A memory system includes a memory device including at least one storage region; and a controller coupled to the memory device. The controller separates write data input from an external device from metadata associated with data stored in the memory device. Based on an operation state of the at least one storage region, the controller stores the write data into a buffer storing data to be transferred to the at least one storage region in the memory device. The controller stores the metadata into the buffer regardless of the operation state of the at least one storage region. The controller transfers the write data or the metadata stored in the buffer to the memory device for storing the write data or the metadata in the memory device.

17 Claims, 17 Drawing Sheets

APPARATUS AND METHOD FOR IMPROVING DATA INPUT/OUTPUT PERFORMANCE OF STORAGE

CROSS-REFERENCE TO RELATED APPLICATIONS

This patent application claims the benefit of Korean Patent Application No. 10-2021-0159566, filed on Nov. 18, 2021, the entire disclosure of which is incorporated herein by reference.

TECHNICAL FIELD

One or more embodiments of the present disclosure described herein relate to a storage, a data processing system including the storage, and more particularly, to an apparatus and a method for inputting or outputting data in the data processing system using a zoned namespace.

BACKGROUND

A paradigm for a computing environment has shifted to ubiquitous computing, which enables computer systems to be accessed virtually anytime and anywhere. As a result, the use of portable electronic devices (e.g., mobile phones, digital cameras, notebook computers) is rapidly increasing. Such portable electronic devices may use or include a memory system having at least one memory device, e.g., a data storage device. The data storage device can be used as a main storage device or an auxiliary storage device of a portable electronic device.

Unlike a hard disk, data storage devices that use non-volatile semiconductor memories exhibit improved stability and durability, have no mechanical driving parts (e.g., a mechanical arm), and perform with high data access speeds and relatively low power consumption. Examples of these types of data storage devices include, but are not limited to, Universal Serial Bus (USB) memory devices, memory cards having various interfaces, and solid state drives (SSDs).

BRIEF DESCRIPTION OF THE DRAWINGS

The description herein makes reference to the accompanying drawings wherein like reference numerals refer to like parts throughout the figures.

DETAILED DESCRIPTION

Figure 1:
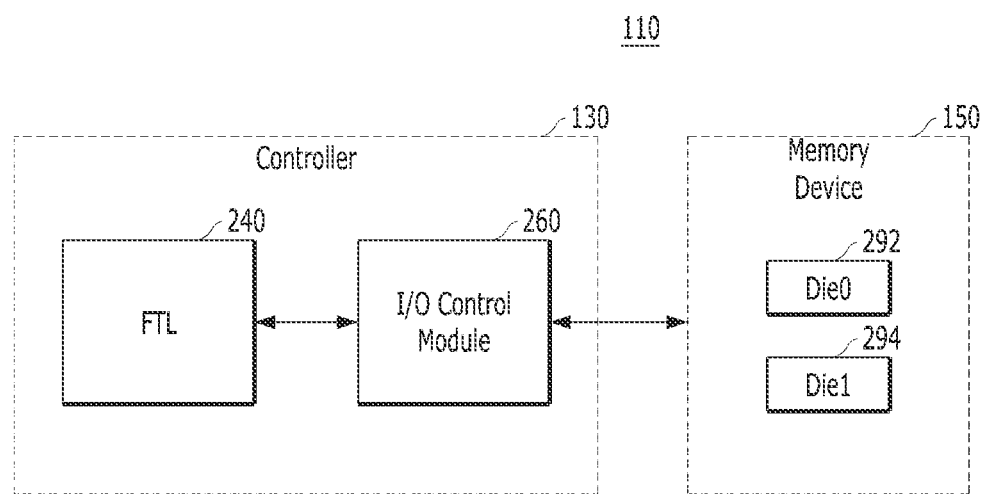
FIG. 1 illustrates a memory system according to an embodiment of the present disclosure.

Various embodiments of the present disclosure are described below with reference to the accompanying drawings. Elements and features of this disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components, e.g., an interface unit, circuitry, etc.

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational, e.g., is not turned on nor activated. The block/unit/circuit/component used with the "configured to" language include hardware, for example, circuits, memory storing program instructions executable to implement the operation, etc. Additionally, "configured to" can include a generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

As used in this disclosure, the term 'circuitry' or 'logic' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'circuitry' or 'logic' applies to all uses of this term in this application, including in any claims. As a further example, as used in this application, the term "circuitry" or "logic" also covers an implementation of merely a processor (or multiple processors) or portion of a processor and its (or their) accompanying software and/or firmware. The term "circuitry" or "logic" also covers, for example, and if applicable to a particular claim element, an integrated circuit for a storage device.

As used herein, the terms "first," "second," "third," and so on are used as labels for nouns that they precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Herein, an item of data, a data item, a data entry or an entry of data may be a sequence of bits. For example, the data item may include the contents of a file, a portion of the file, a page in memory, an object in an object-oriented program, a digital message, a digital scanned image, a part of a video or audio signal, metadata or any other entity which can be represented by a sequence of bits. According to an embodiment, the data item may include a discrete object. According to another embodiment, the data item may include a unit of information within a transmission packet between two different components.

An embodiment of the disclosure may provide a memory system, a data processing system, and an operation process or a method, which may quickly and reliably process data into a memory device by reducing operational complexity and performance degradation of the memory system, thereby enhancing usage efficiency of the memory device.

In an embodiment, a memory device can include a memory device including at least one storage region; and a controller configured to: separate write data input from an external device from metadata associated with data stored in the memory device; either store, based on an operation state of the at least one storage region, the write data into a buffer which is configured to store data to be transferred to the memory device, or store the metadata into the buffer regardless of the operation state of the at least one storage region; and transfer the write data or the metadata inserted into the buffer to the memory device for storing the write data or the metadata in the memory device.

The at least one storage region can be allocated for a zoned namespace. The memory system can further include error handling circuitry configured to recover, when an error occurs in the at least one storage region, the error and control storing the transferred metadata in the at least one storage region after the error is recovered.

The error handling circuitry can be included in the at least one storage region. The at least one storage region can include at least one memory die.

The error handling circuitry can be included in the controller. The at least one storage region can include at least one memory block.

The controller can include flash translation circuitry configured to check the at least one storage region in which the write data is stored and generate metadata associated with the write data; blocking circuitry configured to obstruct the write data and the metadata to be transferred to the at least one storage region when the error handling circuitry detects the error occurred in the at least one storage region; and metadata bypass circuitry configured to allow the metadata to bypass the blocking circuitry while the error is recovered.

The controller can further include metadata pending circuitry configured to await transmission of the metadata from the buffer to the at least one storage region while the error handling circuitry recovers the error in the at least one storage region.

The flash translation circuitry can be further configured to attach different identifiers to a first command for programming the write data in the memory device and a second command for programming the metadata in the memory device.

The controller can include flash translation circuitry configured to check the at least one storage region in which the write data is stored and generate metadata associated with the write data; and metadata bypass circuitry configured to obstruct the write data to be transferred to the at least one storage region and allow transmission of the metadata, when the error handling circuitry detects the error occurred in the at least one storage region.

The controller can be further configured to control the memory device to sequentially the write data in a storage region included in the memory device. The storage region can be allocated for a zoned namespace corresponding to a logical address associated with the write data. The buffer can be arranged corresponding to a memory die or a memory plane including the at least one storage region.

The controller can be further configured to generate metadata associated with the write data stored in the at least one storage region and control the memory device to store the metadata in another storage region included in the memory device.

In another embodiment, a method for operating a memory system can include separating write data input from an external device from metadata associated with data stored in a memory device including at least one storage region; either storing the write data into a buffer capable of storing data to be transferred to the memory device based on an operation state of the at least one storage region or storing the metadata into the buffer regardless of the operation state of the at least one storage region; transferring the write data or the metadata stored in the buffer to the memory device; and programming the transferred write data or the transferred metadata in the at least one storage region of the memory device.

The method can further include allocating the at least one storage region for a zoned namespace, and recovering, when an error occurs in the at least one storage region, the error to program the transferred metadata in the at least one storage region after the error is recovered.

The storing of either the write data or the metadata can include checking the operation state of the at least one storage region; obstructing the write data and the metadata to be stored into the buffer when the error occurs in the at least one storage region; and storing the obstructed metadata into the buffer while the error is recovered.

The method can further include awaiting transmission of the obstructed metadata from the buffer to the at least one storage region while the error is recovered.

The method can further include attaching different identifiers to a first command for programming the write data in the memory device and a second command for programming the metadata in the memory device.

The method can further include generating metadata associated with the write data stored in the at least one storage region after checking the at least one storage region.

The programming of the transferred write data can include sequentially programming the transferred write data in the at least one storage region allocated for a zoned namespace corresponding to a logical address associated with the write data.

The method can further include generating metadata associated with the write data stored in the at least one storage region. The transferred metadata and the transferred write data can be programmed in different storage regions included in the memory device.

In another embodiment, a memory system can include a memory device including plural memory blocks or plural memory dies; and a controller configured to: allocate the plural memory blocks or the plural memory dies for plural zones; receive write data and a logical address associated with the write data from a host; either store the write data into a buffer assigned to at least one memory block or at least one memory die allocated for a zone which corresponds to the logical address among the plural zones, based on whether an error occurs in the at least one memory block or the at least one memory die, or store metadata into the buffer regardless of the error; and transfer the write data or the metadata stored in the buffer to the memory device; and control the memory device to store the transferred write data or the transferred metadata in the plural memory blocks or the plural memory dies.

The controller can store the transferred write data and the transferred metadata by sequentially programming the transferred write data in the memory device based on the logical address, and programming the transferred metadata at a preset location in the memory device regardless of the write data or the logical address.

In another embodiment, a memory system can include a memory device including one or more storage units, which are allocated according to a zoned namespace scheme; and a controller configured to buffer metadata for external data while recovering an error within the storage units, and control the memory device to store, after the recovery, the external data and the buffered metadata into the storage units according to the scheme.

Embodiments described herein provide an apparatus and a method for improving a data input/output operation of a memory system or a data processing system.

Embodiments will now be described with reference to the accompanying drawings, wherein like numbers reference like elements.

FIG. 1 illustrates an embodiment of a memory system according to an embodiment of the present disclosure.

Referring to FIG. 1, a memory system 110 may include a memory device 150 and a controller 130. The memory device 150 and the controller 130 in the memory system 110 may be considered components or elements physically separated from each other. The memory device 150 and the controller 130 may be connected via at least one data path. For example, the data path may include a channel and/or a way.

According to an embodiment, the memory device 150 and the controller 130 may be components or elements functionally divided. Further, according to an embodiment, the memory device 150 and the controller 130 may be implemented with a single chip or a plurality of chips. The controller 130 may perform a data input/output operation in response to a request input from the external device. For example, when the controller 130 performs a read operation in response to a read request input from an external device, data stored in a plurality of non-volatile memory cells included in the memory device 150 is transferred to the controller 130.

According to an embodiment, the memory device 150 can include plural memory dies 292, 294. The memory die may include at least one memory plane. The memory die may be understood as a set of components implemented on a physically distinguishable substrate. Each memory die may be connected to the controller 130 through a data path. Each memory die may include an interface to exchange a piece of data and a signal with the controller 130.

For example, the memory device 150 or each of the plural memory dies 292, 294 can include a plurality of memory planes. According to an embodiment, the memory plane may be considered a logical or a physical partition including at least one memory block, a driving circuit capable of controlling an array including a plurality of non-volatile memory cells, and a buffer that can temporarily store data inputted to, or outputted from, non-volatile memory cells.

Each of the memory dies 292, 294 can include a plurality of memory blocks 152, 154, 156. The memory block 152, 154, 156 may be understood as a group of non-volatile memory cells in which data is removed together by a single erase operation. Although not illustrated, the memory block may include a page which is a group of non-volatile memory cells that store data together during a single program operation or output data together during a single read operation. For example, one memory block may include a plurality of pages. The internal configuration of the memory device 150 shown in FIG. 1 may be different according to performance of the memory system 110. An embodiment of the present disclosure is not limited to the internal configuration shown in FIG. 1.

At least some of the plurality of memory blocks included in the memory device 150 can be allocated for a namespace divided into plural zones, hereinafter, referred to as zoned namespaces (ZNSs). According to an embodiment, the controller 130 may evenly allocate all memory blocks included in the memory device 150 for respective ZNSs. In this case, plural memory blocks allocated for a specific ZNS can include a memory block storing data therein (such as an open block or closed block) and an empty memory block not storing any data therein (such as a free block).

According to an embodiment, the controller 130 may allocate, for a ZNS, at least some of the memory blocks included in the memory device 150, the at least some memory blocks corresponding to a storage capacity required by the ZNS. Herein, the storage capacity may refer to how much storage space the memory device 150 provides. A memory block allocated for a specific ZNS can be released according to garbage collection, and another free block can be newly allocated for the specific ZNS. When the specific ZNS is deactivated, the at least some memory blocks of the deactivated ZNS may become unallocated for any ZNS. The controller 130 may allocate the unallocated memory block for a specific ZNS additionally, as needed, while performing an input/output operation or receiving a request input from an external device.

The ZNS may refer to a scheme of using a namespace divided by plural zones. Herein, the namespace may be considered as a logical storage space which is formattable within the memory device 150. The namespace may have a preset or adjustable storage capacity. When the ZNS is applicable to the memory system 110, data input/output operations may be performed differently from a conventional non-volatile memory system which does not support a scheme of the ZNS.

For example, data (e.g., host data) transferred from an external device (e.g., a host 102, see FIGS. 2 to 3) can be stored in a memory die 292, 294 allocated to a specific zone corresponding to a logical address of the corresponding data. A memory system 110 or a data processing system using a zoned namespace (ZNS) can establish a plurality of zones, and data corresponding to a logical address of a specific range can be stored in each zone. The memory system 110 can allocate at least one memory block, or at least one memory plane, or at least one memory die to each zone. The memory system 110 can sequentially store host data in a zone that can be assigned according to a logical address corresponding to the host data.

The memory system 110 to which a zoned namespace scheme is adopted can allocate at least one memory die 292, 294 or at least one memory block 152, 154, 156 included in the memory device 150 to each zone. In an initialized zone, a write pointer can be located at a starting position of the initialized zone. Herein, the starting position of the zone can indicate a starting position of a memory die, a memory plane, or a memory block allocated to the zone.

As data is stored in a zone of the memory device 150, the write pointer position of the zone can be automatically changed. For example, the write pointer of each zone can be shifted or changed to a location corresponding to the number of logical addresses (LBAs) of data items stored in the zone. For example, data items corresponding to logical addresses of 1 to 100 (LBA1 to LBA100) can be stored in the first zone. When a data item corresponding to a fifth logical address LBA1 is stored in the first zone, the write pointer of the first zone can move to a next position. When data items corresponding to a tenth logical address LBA10 to a twentieth logical address LBA20 are stored in the first zone, the write pointer in the first zone can move by 11 positions. Data items associated in a range of logical addresses corresponding to the first zone can be sequentially stored in the first zone, and the write pointer can be shifted by the number of data items stored in the first zone. An application using a zone can use another logical address when a new data item is stored, can be stored in a location indicated by a write pointer, and generate map data (or metadata) which associates or links a logical address of the new data item with a physical address indicating the location.

The memory system 110 adopting a zoned namespace scheme can support that plural application programs can sequentially store plural data items in plural zones assigned or allocated for each of the plural application programs. Herein, plural zones can be distinguished from each other based on not only a logical space but also non-volatile memory blocks. Accordingly, similar data items may be grouped and stored together in each zone. Because data items are stored in each zone sequentially and then deleted in a unit of zone, garbage which is invalid data might not occur. Thus, the memory system 110 adopting the zoned namespace scheme does not have to perform garbage collection, and overheads in the memory system 110 can be reduced.

Further, in response to a request from an external device, the memory system 110 can reset a zone among a plurality of zones. In this case, the write pointer may be set to the start position of the reset zone. According to an embodiment, in response to a request from an external device, the memory system 110 may reset all plural zones (e.g., a low-level format). In this case, the write pointers of the plural zones can be reset or initialized.

Referring to FIG. 1, the controller 130 can include a Flash Translation Layer (FTL) 240 and an input/output control module 260. The flash translation layer (FTL) 240 included in the controller 130 can perform a data processing operation for storing data (e.g., host data) transferred from an external device (e.g., the host 102, see FIGS. 2 to 3) in the memory device 150. Because an address scheme (e.g., a logical address) used by the external device and an address scheme (e.g., a physical address) used by the memory system 110 are different from each other, the flash translation layer (FTL, 240) can determine a location at which the data is stored in the memory device 150. Further, the flash translation layer (FTL) 240 can generate metadata or map data connecting a logical address to a physical address. Herein, the logical address and the physical address are different from each other, but both addresses are associated with the same data stored in the memory device 150.

The input/output control module 260 can control an operation for storing data transferred from the flash translation layer (FTL) 240 in the memory device 150. The memory device 150 can include the plural memory dies 292, 294 or a plurality of planes. Plural data input/output operations of the memory device 150 can be performed in parallel to improve input/output performance of the memory system 110. The input/output control module 260 can schedule the plural data input/output operations performed in the plural memory dies 292, 294 or the plurality of planes.

According to an embodiment, the input/output control module 260 may differently control or schedule operations according to a type of data transferred to the plural memory dies 292, 294 or the plurality of planes. As described above, host data, which is input from the host 102 as an external device, can be sequentially stored in a memory area allocated for a zone corresponding to logical addresses of the host data. However, metadata generated and managed by the memory system 110 for controlling internal operations, such as map data generated by the flash translation layer (FTL) 240, could be free from restrictions such as host data. For example, the memory system 110 can store meta data in a preset location or an arbitrary location of the memory device 150. Accordingly, the input/output control module 260 can control a data processing operation differently depending on which one of host data and metadata is transmitted to the memory device 150.

According to an embodiment, the input/output control module 260 in the controller 130 can include plural buffers corresponding to the plural memory dies 292, 294 or a plurality of planes. Each of the plural buffers can have a data structure such as a queue. The input/output control module 260 can determine whether to include data transmitted from the flash translation layer (FTL) 240 in each of the plural buffers. Data stored in each of the plural buffers can be sequentially transferred to the plural memory dies 292, 294 or the plurality of planes.

According to an embodiment, the input/output control module 260 can be included in the memory interface 142 described with reference to FIGS. 2 to 3. In another embodiment, the input/output control module 260 can be disposed between the flash translation layer (FTL) 240 and the memory interface 142 which are described with reference to FIG. 3.

The memory system 110 according to an embodiment of the present disclosure can perform a data input/output operation within the memory device 150 supporting a namespace divided by zones. The memory system 100 can sequentially store data (e.g., host data), which is input from an external device (e.g., the host 102, refer to FIGS. 2 to 3), in a memory region of the memory device 150, which is allocated for a zone corresponding to a logical address. But, unlike host data, metadata (e.g., map data) generated by the memory system 110 can be stored in an arbitrary location or a preset location in the memory device 150. In a procedure of storing the host data and the metadata, the memory system 110 can proceed or queue a program operation, based on an operation state regarding the memory blocks 152, 154, 156 (refer to FIG. 2) or the memory dies 292, 294 in which the host data is to be stored, whether an error occurs in the memory blocks 152, 154, 156 (refer to FIG. 2) or the memory dies 292, 294 of the memory device 150, or whether the error is recovered or corrected. On the other hand, the memory system 110 can transmit the metadata to the memory device 150 regardless of whether an error occurred in the memory blocks 152, 154, 156 or the memory dies 292, 294 in which the metadata is to be stored or whether the error is recovered or corrected, so that the metadata could be stored in the memory device 150.

Figure 2:
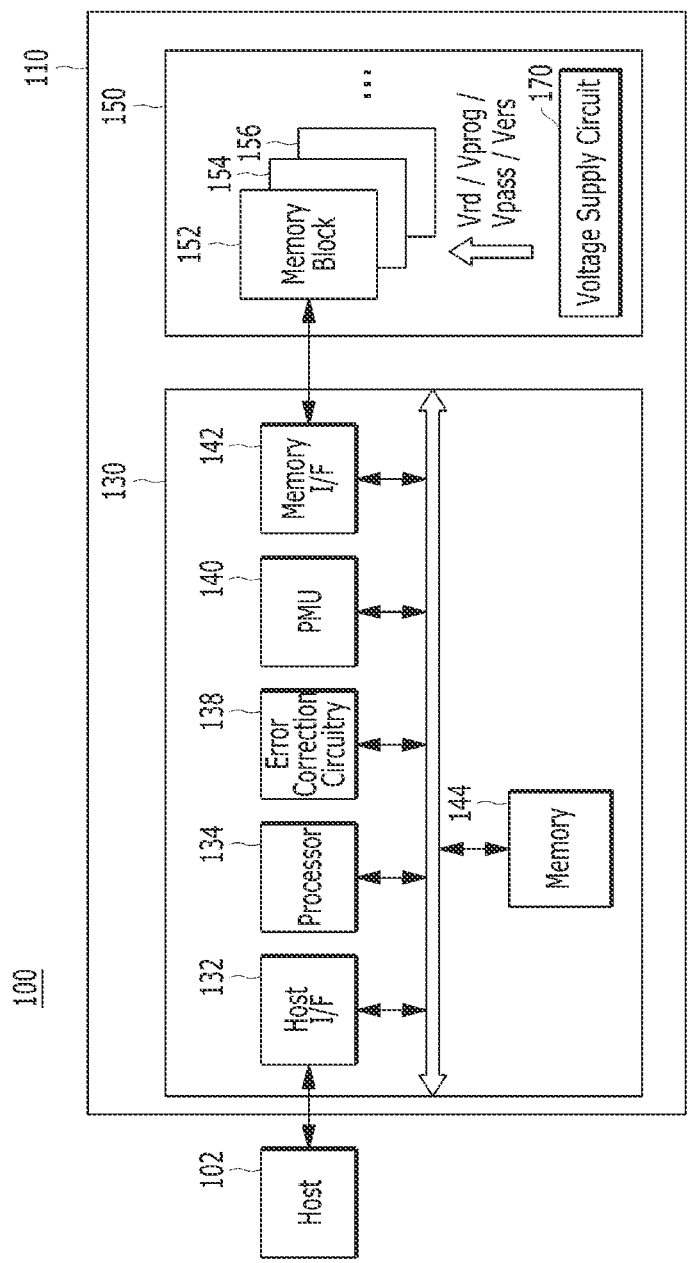
FIG. 2 illustrates a data processing system according to another embodiment of the present disclosure.

Referring to FIGS. 1 and 2, when at least some of the plurality of memory blocks 152, 154, 156 included in the memory dies 292, 294 are used as a write cache or write buffer for temporarily storing write data, the memory device 150 can transfer a program completion signal corresponding to a program request to the controller 130 more quickly. Thereafter, data temporarily stored in a write cache or a write buffer can be moved to a data storage region in an idle time when there is no data input/output operation. A location in which data is stored can be changed or adjusted according to data characteristics. Also, when an error occurs in the data storage region, data can be temporarily stored in the write cache or the write buffer. However, because host data is sequentially stored in the memory device 150 supporting a namespace divided by zones, it is necessary to secure an additional write cache in the memory device 150. Because there is no write cache in the memory device 150, a memory region allocated and used for the write cache could be eliminated and the data storage region can increase. However, in a case when the memory device 150 does not include any write cache or any write buffer, it might be difficult to program data in the data storage region if an error occurs in the data storage region. However, because metadata, not host data, does not have to be sequentially programmed in a specific zone corresponding to a logical address like the host data, the controller 130 included in the memory system 110 can transfer the metadata to the memory device 150, regardless of whether an error occurs in the data storage region or whether the error is recovered or corrected.

According to an embodiment, the memory system 110 can differently control or process program scheduling according to whether data programmed in the memory device 150 is host data or meta data. When an error occurs in a non-volatile memory device, the controller can cease or stop transmission of data to be programmed to the non-volatile memory device in response to a notification of the non-volatile memory device. In response to an error event, the controller can cease or stop transmission of the host data but perform transmission of the metadata to the non-volatile memory device.

The memory device 150 can include the plural memory dies 292, 294 or plural memory planes, and the controller 130 may include plural buffers such as queues corresponding to each of the plural memory dies 292, 294 or the plural memory planes. Each of the plural buffers can temporarily store data to be transmitted to each of the plural memory dies 292, 294 or the plural memory planes. The controller 130 can add host data to the plural buffers based on whether an error occurs in the memory device 150 or whether the error is recovered or corrected. Unlike host data, the controller 130 can add metadata to the plural buffers regardless of whether an error has occurred in the memory device 150 or whether the error is recovered or corrected. After an error occurring in the memory device 150 is recovered or corrected, host data stored in the buffer can be sequentially transferred. Through this, the metadata may be preferentially transferred to the memory device 150, as compared to the host data. The memory device 150 can program the metadata in a preset position or an arbitrary position. After the error occurring in the memory device 150 is recovered or corrected, the controller 130 can store only the host data among the data to be stored in the memory device 150, and the host data is sequentially transferred and stored at locations corresponding to a namespace divided by the zone unit. Through these operations, the memory system 110 can reduce or avoid delay in a program operation due to an error.

Figure 3:
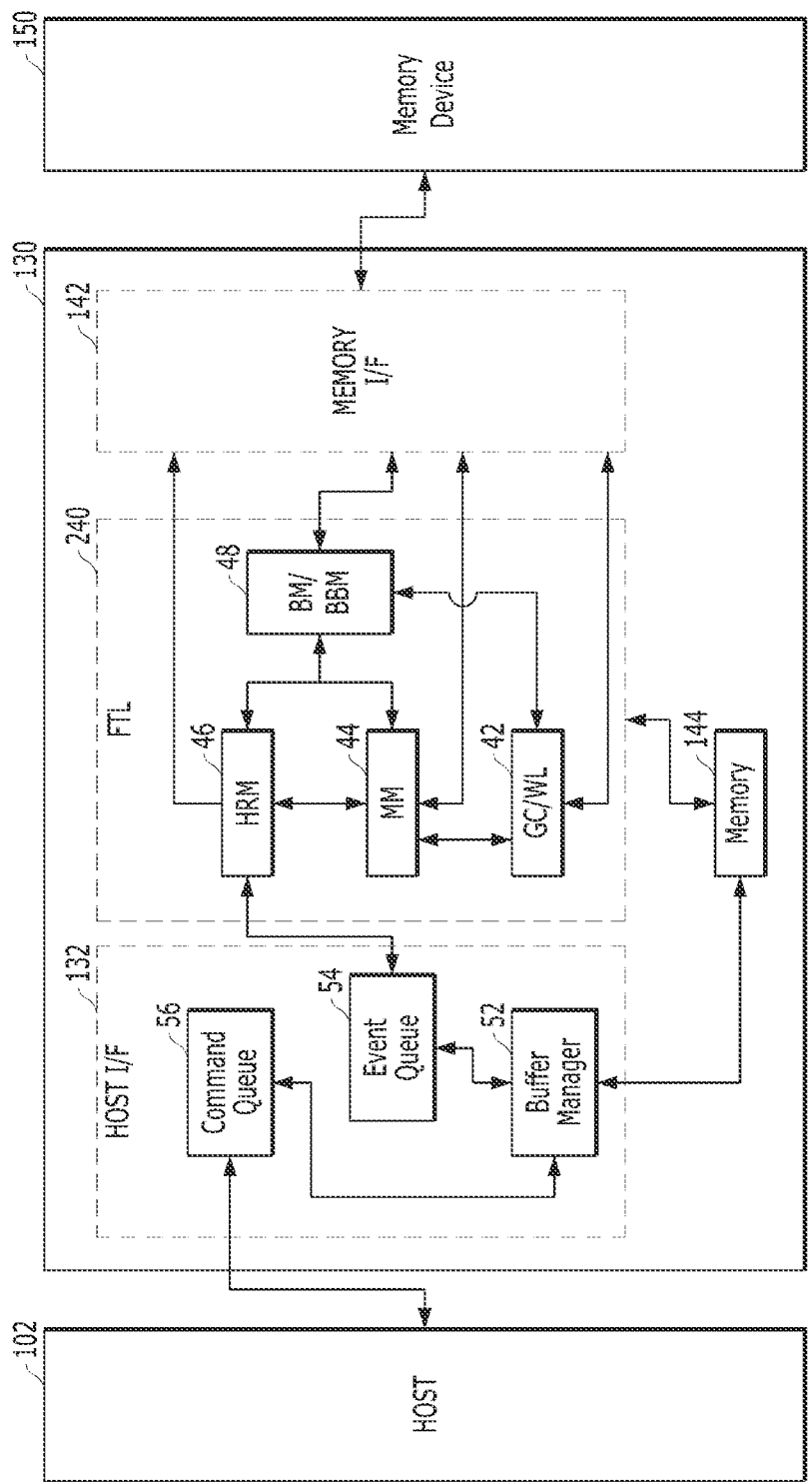
FIG. 3 illustrates a memory system according to another embodiment of the present disclosure.

FIGS. 2 and 3 illustrate some operations that may be performed by the memory system 110 according to one or more embodiments of the present disclosure.

Referring to FIG. 2, the data processing system 100 may include a host 102 engaged or coupled with a memory system, such as memory system 110. For example, the host 102 and the memory system 110 can be coupled to each other via a data bus, a host cable and the like to perform data communication.

The memory system 110 may include a memory device 150 and a controller 130. The memory device 150 and the controller 130 in the memory system 110 may be considered components or elements physically separated from each other. The memory device 150 and the controller 130 may be connected via at least one data path. For example, the data path may include a channel and/or a way.

According to an embodiment, the memory device 150 and the controller 130 may be components or elements functionally divided. Further, according to an embodiment, the memory device 150 and the controller 130 may be implemented with a single chip or a plurality of chips. The controller 130 may perform a data input/output operation in response to a request input from the external device. For example, when the controller 130 performs a read operation in response to a read request input from an external device, data stored in a plurality of non-volatile memory cells included in the memory device 150 is transferred to the controller 130.

As shown in FIG. 2, the memory device 150 may include a plurality of memory blocks 152, 154, 156. The memory block 152, 154, 156 may be understood as a group of non-volatile memory cells in which data is removed together by a single erase operation. Although not illustrated, the memory block 152, 154, 156 may include a page which is a group of non-volatile memory cells that store data together during a single program operation or output data together during a single read operation. For example, one memory block may include a plurality of pages.

For example, the memory device 150 may include a plurality of memory planes or a plurality of memory dies. According to an embodiment, the memory plane may be considered a logical or a physical partition including at least one memory block, a driving circuit capable of controlling an array including a plurality of non-volatile memory cells, and a buffer that can temporarily store data inputted to, or outputted from, non-volatile memory cells.

In addition, according to an embodiment, the memory die may include at least one memory plane. The memory die may be understood to be a set of components implemented on a physically distinguishable substrate. Each memory die may be connected to the controller 130 through a data path. Each memory die may include an interface to exchange an item of data and a signal with the controller 130.

According to an embodiment, the memory device 150 may include at least one memory block 152, 154, 156, at least one memory plane, or at least one memory die. The internal configuration of the memory device 150 shown in FIGS. 1 and 2 may be different according to performance of the memory system 110. An embodiment of the present disclosure is not limited to the internal configuration shown in FIG. 2.

Referring to FIG. 2, the memory device 150 may include a voltage supply circuit 170 capable of supplying at least some voltage into the memory block 152, 154, 156. The voltage supply circuit 170 may supply a read voltage Vrd, a program voltage Vprog, a pass voltage Vpass, or an erase voltage Vers into a non-volatile memory cell included in the memory block. For example, during a read operation for reading data stored in the non-volatile memory cell included in the memory block 152, 154, 156, the voltage supply circuit 170 may supply the read voltage Vrd into a selected non-volatile memory cell. During the program operation for storing data in the non-volatile memory cell included in the memory block 152, 154, 156, the voltage supply circuit 170 may supply the program voltage Vprog into a selected non-volatile memory cell. Also, during a read operation or a program operation performed on the selected nonvolatile memory cell, the voltage supply circuit 170 may supply a pass voltage Vpass into a non-selected nonvolatile memory cell. During the erasing operation for erasing data stored in the non-volatile memory cell included in the memory block 152, 154, 156, the voltage supply circuit 170 may supply the erase voltage Vers into the memory block.

The memory device 150 may store information regarding various voltages which are supplied to the memory block 152, 154, 156 based on which operation is performed. For example, when a non-volatile memory cell in the memory block 152, 154, 156 can store multi-bit data, plural levels of the read voltage Vrd for recognizing or reading the multi-bit data item may be required. The memory device 150 may include a table including information corresponding to plural levels of the read voltage Vrd, corresponding to the multi-bit data item. For example, the table can include bias values stored in a register, each bias value corresponding to a specific level of the read voltage Vrd. The number of bias values for the read voltage Vrd that is used for a read operation may be limited to a preset range. Also, the bias values can be quantized.

The host 102 may include a portable electronic device, e.g., a mobile phone, an MP3 player, a laptop computer, etc., or a non-portable electronic device, e.g., a desktop computer, a game player, a television, a projector, etc.

The host 102 may also include at least one operating system (OS), which can control functions and operations performed in the host 102. The OS can provide interoperability between the host 102 engaged operatively with the memory system 110 and a user who intends to store data in the memory system 110. The OS may support functions and operations corresponding to user's requests. By way of example but not limitation, the OS can be classified into a general operating system and a mobile operating system according to mobility of the host 102. The general operating system may be split into a personal operating system and an enterprise operating system according to system requirements or a user environment. As compared with the personal operating system, the enterprise operating systems can be specialized for securing and supporting high performance computing.

The mobile operating system may be subject to support services or functions for mobility, e.g., a power saving function. The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to the plurality of commands within the memory system 110.

A controller 130 in the memory system 110 may control a memory device 150 in response to a request or a command input from the host 102. For example, the controller 130 may perform a read operation to provide data read from the memory device 150 to the host 102 and may perform a write operation (or a program operation) to store data input from the host 102 in the memory device 150. In order to perform data input/output (I/O) operations, the controller 130 may control and manage internal operations of reading data, programming data, erasing data, or the like.

According to an embodiment, the controller 130 may include a host interface 132, a processor 134, the error correction circuitry (ECC) 138, a power management unit (PMU) 140, a memory interface 142, and a memory 144. Components included in the controller 130 as illustrated in FIG. 2 may vary according to structures, functions, operation performance, or the like, regarding the memory system 110.

For example, the memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like. Components may be added to or omitted from the controller 130 according to implementation of the memory system 110.

The host 102 and the memory system 110 each may include a controller or an interface for transmitting and receiving signals, data, and the like, in accordance with one or more predetermined protocols. For example, the host interface 132 in the memory system 110 may include an apparatus capable of transmitting signals, data, and the like to the host 102 or receiving signals, data, and the like from the host 102.

The host interface 132 included in the controller 130 may receive signals, commands (or requests), and/or data input from the host 102 via a bus. For example, the host 102 and the memory system 110 may use a predetermined set of rules or procedures for data communication or a preset interface to transmit and receive data therebetween. Examples of sets of rules or procedures for data communication standards or interfaces supported by the host 102 and the memory system 110 for sending and receiving data include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIe or PCI-e), Serial-attached SCSI (SAS), Serial Advanced Technology Attachment (SATA), Mobile Industry Processor Interface (MIPI), and the like. According to an embodiment, the host interface 132 is a type of layer for exchanging data with the host 102 and is implemented with, or driven by, firmware called a host interface layer (HIL). According to an embodiment, the host interface 132 can include a command queue.

The Integrated Drive Electronics (IDE) or Advanced Technology Attachment (ATA) may be used as one of the interfaces for transmitting and receiving data and, for example, may use a cable including 40 wires connected in parallel to support data transmission and data reception between the host 102 and the memory system 110. When a plurality of memory systems 110 are connected to a single host 102, the plurality of memory systems 110 may be divided into a master and a slave by using a position or a dip switch to which the plurality of memory systems 110 are connected. The memory system 110 set as the master may be used as a main memory device. The IDE (ATA) may include, for example, Fast-ATA, ATAPI, or Enhanced IDE (EIDE).

A Serial Advanced Technology Attachment (SATA) interface is a type of serial data communication interface that is compatible with various ATA standards of parallel data communication interfaces which are used by Integrated Drive Electronics (IDE) devices. The 40 wires in the IDE interface can be reduced to six wires in the SATA interface. For example, 40 parallel signals for the IDE can be converted into 6 serial signals for the SATA interface. The SATA interface has been widely used because of its faster data transmission and reception rate and its less resource consumption in the host 102 used for the data transmission and reception. The SATA interface may connect up to 30 external devices to a single transceiver included in the host 102. In addition, the SATA interface can support hot plugging that allows an external device to be attached to or detached from the host 102, even while data communication between the host 102 and another device is being executed. Thus, the memory system 110 can be connected or disconnected as an additional device, like a device supported by a universal serial bus (USB) even when the host 102 is powered on. For example, in the host 102 having an eSATA port, the memory system 110 may be freely attached to or detached from the host 102 like an external hard disk.

Small Computer System Interface (SCSI) is a type of serial data communication interface used for connecting a computer or a server with other peripheral devices. The SCSI can provide a high transmission speed, as compared with other interfaces such as IDE and SATA. In the SCSI, the host 102 and at least one peripheral device (e.g., memory system 110) are connected in series, but data transmission and reception between the host 102 and each peripheral device may be performed through a parallel data communication. In the SCSI, it is easy to connect or disconnect a device such as the memory system 110 to or from the host 102. The SCSI can support connections of 15 other devices to a single transceiver included in host 102.

Serial Attached SCSI (SAS) can be understood as a serial data communication version of the SCSI. In the SAS, the host 102 and a plurality of peripheral devices are connected in series, and data transmission and reception between the host 102 and each peripheral device may be performed in a serial data communication scheme. The SAS can support connection between the host 102 and the peripheral device through a serial cable instead of a parallel cable, to easily manage equipment using the SAS and enhance or improve operational reliability and communication performance. The SAS may support connections of eight external devices to a single transceiver included in the host 102.

The Non-volatile memory express (NVMe) is a type of interface based at least on a Peripheral Component Interconnect Express (PCIe) designed to increase performance and design flexibility of the host 102, servers, computing devices, and the like equipped with the non-volatile memory system 110. The PCIe can use a slot or a specific cable for connecting a computing device (e.g., host 102) and a peripheral device (e.g., memory system 110). For example, the PCIe can use a plurality of pins (e.g., 18 pins, 32 pins, 49 pins, or 82 pins) and at least one wire (e.g., ×1, ×4, ×8, or ×16) to achieve high speed data communication over several hundred MB per second (e.g., 250 MB/s, 500 MB/s, 984.6250 MB/s, or 1969 MB/s). According to an embodiment, the PCIe scheme may achieve bandwidths of tens to hundreds of Giga bits per second. The NVMe can support an operation speed of the non-volatile memory system 110, such as an SSD, that is faster than a hard disk.

According to an embodiment, the host 102 and the memory system 110 may be connected through a universal serial bus (USB). The Universal Serial Bus (USB) is a type of scalable, hot-pluggable plug-and-play serial interface that can provide cost-effective standard connectivity between the host 102 and peripheral devices such as a keyboard, a mouse, a joystick, a printer, a scanner, a storage device, a modem, a video camera, and the like. A plurality of peripheral devices such as the memory system 110 may be coupled to a single transceiver included in the host 102.

Referring to FIG. 2, the error correction circuitry 138 can correct error bits of data read from the memory device 150, and may include an error correction code (ECC) encoder and an ECC decoder. The ECC encoder may perform error correction encoding of data to be programmed in the memory device 150 to generate encoded data into which a parity bit is added, and store the encoded data in the memory device 150. The ECC decoder can detect and correct error bits contained in the data read from the memory device 150 when the controller 130 reads the data stored in the memory device 150. For example, after performing error correction decoding on the data read from the memory device 150, the error correction circuitry 138 determines whether the error correction decoding has succeeded or not, and outputs an instruction signal, e.g., a correction success signal or a correction fail signal, based on a result of the error correction decoding. The error correction circuitry 138 may use a parity bit, which has been generated during the ECC encoding process for the data stored in the memory device 150, in order to correct the error bits of the read data. When the number of the error bits is greater than or equal to the number of correctable error bits, the error correction circuitry 138 may not correct the error bits and instead may output the correction fail signal indicating failure in correcting the error bits.

According to an embodiment, the error correction circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), or the like. The error correction circuitry 138 may include all circuits, modules, systems, and/or devices for performing the error correction operation based on at least one of the above described codes.

For example, the ECC decoder may perform hard decision decoding or soft decision decoding on data transmitted from the memory device 150. The hard decision decoding can be understood as one of two methods broadly classified for error correction. The hard decision decoding may include an operation of correcting an error bit by reading digital data of '0' or '1' from a non-volatile memory cell in the memory device 150. Because the hard decision decoding handles a binary logic signal, the circuit/algorithm design or configuration may be simpler and a processing speed may be faster than the soft decision decoding.

The soft decision decoding may quantize a threshold voltage of a non-volatile memory cell in the memory device 150 by two or more quantized values, e.g., multiple bit data, approximate values, an analog value, and the like, in order to correct an error bit based on the two or more quantized values. The controller 130 can receive two or more alphabets or quantized values from a plurality of non-volatile memory cells in the memory device 150, and then perform a decoding based on information generated by characterizing the quantized values as a combination of information such as conditional probability or likelihood.

According to an embodiment, the ECC decoder may use a low-density parity-check and generator matrix (LDPC-GM) code among methods designed for the soft decision decoding. The low-density parity-check (LDPC) code uses an algorithm that can read values of data from the memory device 150 in several bits according to reliability, not simply data of 1 or 0 like the hard decision decoding, and iteratively repeats it through a message exchange in order to improve reliability of the values. Then, the values are finally determined as data of 1 or 0. For example, a decoding algorithm using LDPC codes can be understood as probabilistic decoding. In the hard decision decoding, a value output from a non-volatile memory cell is decoded as 0 or 1. Compared to the hard decision decoding, the soft decision decoding can determine the value stored in the non-volatile memory cell based on the stochastic information. Regarding bit-flipping which may be considered an error that can occur in the memory device 150, the soft decision decoding may provide improved probability of correcting the error and recovering data, as well as providing reliability and stability of corrected data. The LDPC-GM code may have a scheme in which internal LDGM codes can be concatenated in series with high-speed LDPC codes.

According to an embodiment, the ECC decoder may use, for example, low-density parity-check convolutional codes (LDPC-CCs) for the soft decision decoding. The LDPC-CCs may have a scheme using a linear time encoding and a pipeline decoding based on a variable block length and a shift register.

According to an embodiment, the ECC decoder may use, for example, a Log Likelihood Ratio Turbo Code (LLR-TC) for the soft decision decoding. A Log Likelihood Ratio (LLR) may be calculated as a non-linear function for a distance between a sampled value and an ideal value. In addition, a Turbo Code (TC) may include a simple code, for example, a Hamming code, in two or three dimensions and repeat decoding in a row direction and a column direction to improve reliability of values.

The power management unit (PMU) 140 may control electrical power provided to the controller 130. The PMU 140 may monitor the electrical power supplied to the memory system 110, e.g., a voltage supplied to the controller 130, and provide the electrical power to components included in the controller 130. The PMU 140 may not only detect power-on or power-off, but also generate a trigger signal to enable the memory system 110 to urgently back up a current state when the electrical power supplied to the memory system 110 is unstable. According to an embodiment, the PMU 140 may include a device or a component capable of accumulating electrical power that may be used in an emergency.

The memory interface 142 may serve as an interface for handling commands and data transferred between the controller 130 and the memory device 150, in order to allow the controller 130 to control the memory device 150 in response to a command or a request input from the host 102. The memory interface 142 may generate a control signal for the memory device 150 and may process data input to, or output from, the memory device 150 under the control of the processor 134 in a case when the memory device 150 is a flash memory.

For example, when the memory device 150 includes a NAND flash memory, the memory interface 142 includes a NAND flash controller (NFC). The memory interface 142 can provide an interface for handling commands and data between the controller 130 and the memory device 150. In accordance with an embodiment, the memory interface 142 can be implemented through, or driven by, firmware called a Flash Interface Layer (FIL) for exchanging data with the memory device 150.

According to an embodiment, the memory interface 142 may support an open NAND flash interface (ONFi), a toggle mode, or the like, for data input/output with the memory device 150. For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 can be achieved through at least one interface regarding an asynchronous single data rate (SDR), a synchronous double data rate (DDR), a toggle double data rate (DDR), or the like.

The memory 144 may be used as a working memory of the memory system 110 or the controller 130, while temporarily storing transactional data of operations performed in the memory system 110 and the controller 130. For example, the memory 144 may temporarily store read data output from the memory device 150 in response to a read request from the host 102 before the read data is output to the host 102. In addition, the controller 130 may temporarily store write data input from the host 102 in the memory 144 before programming the write data in the memory device 150. When the controller 130 controls operations, such as a data read operation, a data write or program operation, a data erase operation, etc., of the memory device 150, data transmitted between the controller 130 and the memory device 150 of the memory system 110 may be temporarily stored in the memory 144.

In addition to the read data or write data, the memory 144 may store information, e.g., map data, read requests, program requests, etc. used for inputting or outputting data between the host 102 and the memory device 150. According to an embodiment, the memory 144 may include one or more of a command queue, a program memory, a data memory, a write buffer/cache, a read buffer/cache, a data buffer/cache, a map buffer/cache, and so on. The controller 130 may allocate some storage space in the memory 144 for a component which is established to carry out a data input/output operation. For example, the write buffer established in the memory 144 may be used to temporarily store target data subject to a program operation.

In an embodiment, the memory 144 may be implemented with a volatile memory. For example, the memory 144 may be implemented with a static random access memory (SRAM), a dynamic random access memory (DRAM), or both. Although FIG. 2 illustrates, for example, the memory 144 disposed within the controller 130, embodiments are not limited thereto. The memory 144 may be located within or external to the controller 130. For instance, the memory 144 may be embodied by an external volatile memory having a memory interface transferring data and/or signals between the memory 144 and the controller 130.

The processor 134 may control the overall operations of the memory system 110. For example, the processor 134 can control a program operation or a read operation of the memory device 150 in response to a write request or a read request entered from the host 102. According to an embodiment, the processor 134 may execute firmware to control the program operation or the read operation in the memory system 110. Herein, the firmware may be referred to as a flash translation layer (FTL). An example of the FTL will be described in detail, referring to FIGS. 3 and 4. According to an embodiment, the processor 134 may be implemented with a microprocessor, a central processing unit (CPU), or the like.

According to an embodiment, the memory system 110 may be implemented with at least one multi-core processor. The multi-core processor is a type of circuit or chip in which two or more cores, which are considered distinct processing regions, are integrated. For example, when a plurality of cores in the multi-core processor drive or execute a plurality of flash translation layers (FTLs) independently, a data input/output speed (or performance) of the memory system 110 may be improved. According to an embodiment, the data input/output (I/O) operations in the memory system 110 may be independently performed through different cores in the multi-core processor.

The processor 134 in the controller 130 may perform an operation corresponding to a request or a command input from the host 102. Further, the memory system 110 may perform an operation independent from a command or a request input from the host 102. In one case, an operation performed by the controller 130 in response to the request or the command input from the host 102 may be considered a foreground operation, while an operation performed by the controller 130 independently from the request or the command input from the host 102 may be considered a background operation. The controller 130 can perform foreground or background operations for reading, writing, or erasing data in the memory device 150. In addition, a parameter set operation corresponding to a set parameter command or a set feature command as a set command transmitted from the host 102 may be considered a foreground operation. Background operations that can be performed without a command transmitted from the host 102 by the controller 130 include garbage collection (GC), wear leveling (WL), bad block management for identifying and processing bad blocks, or the like.

According an embodiment, substantially similar operations may be performed as both the foreground operation and the background operation. For example, when the memory system 110 performs garbage collection in response to a request or a command input from the host 102 (e.g., Manual GC), the garbage collection can be considered a foreground operation. When the memory system 110 performs garbage collection independently of the host 102 (e.g., Auto GC), the garbage collection can be considered a background operation.

When the memory device 150 includes a plurality of dies (or a plurality of chips) each including a plurality of non-volatile memory cells, the controller 130 may perform parallel processing regarding plural requests or commands input from the host 102 in order to improve performance of the memory system 110. For example, the transmitted requests or commands may be divided into plural groups including at least some of a plurality of planes, a plurality of dies, or a plurality of chips included in the memory device 150, and the plural groups of requests or commands are processed individually or in parallel in each plane, each die or each chip.

The memory interface 142 in the controller 130 may be connected to the plurality of dies or chips in the memory device 150 through at least one channel and at least one way. When the controller 130 distributes and stores data in the plurality of dies through each channel or each way in response to requests or commands associated with a plurality of pages including non-volatile memory cells, a plurality of operations corresponding to the requests or the commands can be performed simultaneously or in parallel in the plurality of dies or planes. Such a processing method or scheme can be considered to be an interleaving method. Because a data input/output speed of the memory system 110 increases by operating with the interleaving method, data I/O performance of the memory system 110 can be improved.

By way of example but not limitation, the controller 130 can recognize statuses of a plurality of channels (or ways) associated with the plurality of dies included in the memory device 150. The controller 130 may determine a status of each channel or each way as one of a busy status, a ready status, an active status, an idle status, a normal status, and an abnormal status. The determination of which channel or way an instruction (and/or a data) is delivered through by the controller can be associated with a physical block address. The controller 130 may refer to descriptors delivered from the memory device 150. The descriptors may include a block or page of parameters describing something about the memory device 150. The descriptors can have a predetermined format or structure. For instance, the descriptors may include device descriptors, configuration descriptors, unit descriptors, and the like. The controller 130 may refer to, or use, the descriptors to determine which channel(s) or way(s) is used to exchange an instruction or data.

Referring to FIG. 2, the memory device 150 in the memory system 110 may include a plurality of memory blocks 152, 154, 156. Each of the plurality of memory blocks 152, 154, 156 includes a plurality of non-volatile memory cells. According to an embodiment, the memory block 152, 154, 156 can be a group of non-volatile memory cells erased together. The memory block 152, 154, 156 may include a plurality of pages which is a group of non-volatile memory cells read or programmed together.

In an embodiment, each memory block 152, 154, or 156 may have a three-dimensional stack structure for a high integration. Further, the memory device 150 may include a plurality of dies, each die including a plurality of planes, each plane including the plurality of memory blocks 152, 154, 156. A configuration of the memory device 150 may be changed depending on performance of the memory system 110.

FIG. 2 illustrates the memory device 150 that includes the plurality of memory blocks 152, 154, and 156. The plurality of memory blocks 152, 154, and 156 may be any of single-level cell (SLC) memory blocks, multi-level cell (MLC) memory blocks, or the like, according to the number of bits that can be stored in one memory cell. An SLC memory block includes a plurality of pages implemented by memory cells, each memory cell storing one bit of data. An SLC memory block may have higher data I/O operation performance and higher durability than the MLC memory block. The MLC memory block includes a plurality of pages implemented by memory cells, each memory cell storing multi-bit data, e.g., two or more bits of data. The MLC memory block may have larger storage capacity for the same space compared to the SLC memory block. The MLC memory block can be highly integrated in a view of storage capacity.

In an embodiment, the memory device 150 may be implemented with MLC memory blocks such as a double level cell (DLC) memory block, a triple-level cell (TLC) memory block, a quadruple-level cell (QLC) memory block, and a combination thereof. The DLC memory block may include a plurality of pages implemented by memory cells, each memory cell capable of storing 2-bit data. The TLC memory block can include a plurality of pages implemented by memory cells, each memory cell capable of storing 3-bit data. The QLC memory block can include a plurality of pages implemented by memory cells, each memory cell capable of storing 4-bit data. In another embodiment, the memory device 150 can be implemented with a block including a plurality of pages implemented by memory cells, each memory cell capable of storing five or more bits of data.

According to an embodiment, the controller 130 may use an MLC memory block included in the memory device 150 as an SLC memory block that stores one-bit data in one memory cell. A data input/output speed of the multi-level cell (MLC) memory block can be slower than that of the SLC memory block. That is, when the MLC memory block is used as the SLC memory block, a margin for a read or program operation can be reduced. For example, the controller 130 may perform a data input/output operation with a higher speed when the MLC memory block is used as the SLC memory block. Thus, the controller 130 may use the MLC memory block as a SLC buffer to temporarily store data because the buffer may require a high data input/output speed for improving performance of the memory system 110.

Further, according to an embodiment, the controller 130 can program data in an MLC a plurality of times without performing an erase operation on a specific MLC memory block included in the memory device 150. In general, non-volatile memory cells do not support data overwrite. However, the controller 130 may program 1-bit data in the MLC a plurality of times using a feature in which the MLC is capable of storing multi-bit data. For a MLC overwrite operation, the controller 130 may store the number of program times as separate operation information when 1-bit data is programmed in an MLC. According to an embodiment, an operation for uniformly levelling threshold voltages of the MLCs may be carried out before another 1-bit data is programmed in the same MLCs, each having stored 1-bit data.

In an embodiment, the memory device 150 is embodied as a non-volatile memory such as a flash memory, for example, a NAND flash memory, a NOR flash memory, or the like. In another embodiment, the memory device 150 may be implemented by at least one of a phase change random access memory (PCRAM), a ferroelectrics random access memory (FRAM), a transfer torque random access memory (STT-RAM), and a spin transfer torque magnetic random access memory (STT-MRAM), or the like.

Referring to FIG. 3, the controller 130 in a memory system operates along with the host 102 and the memory device 150. As illustrated, the controller 130 includes the host interface 132, a flash translation layer (FTL) 240, the memory interface 142, and the memory 144 previously identified with reference to FIG. 2.

According to an embodiment, the error correction circuitry 138 illustrated in FIG. 2 may be included in the flash translation layer (FTL) 240. In another embodiment, the error correction circuitry 138 may be implemented as a separate module, a circuit, firmware, or the like, which is included in or associated with the controller 130.

The host interface 132 may handle commands, data, and the like transmitted from the host 102. By way of example but not limitation, the host interface 132 may include a command queue 56, a buffer manager 52, and an event queue 54. The command queue 56 may sequentially store the commands, the data, and the like received from the host 102, and output them to the buffer manager 52, for example, in an order in which they are stored in the command queue 56. The buffer manager 52 may classify, manage, or adjust the commands, the data, and the like received from the command queue 56. The event queue 54 may sequentially transmit events for processing the commands, the data, and the like received from the buffer manager 52.

A plurality of commands or data of the same characteristic may be transmitted from the host 102, or a plurality of commands and data of different characteristics may be transmitted to the memory system 110 after being mixed or jumbled by the host 102. For example, a plurality of commands for reading data, i.e., read commands, may be delivered, or a command for reading data, i.e., a read command, and a command for programming/writing data, i.e., a write command, may be alternately transmitted to the memory system 110. The host interface 132 may sequentially store commands, data, and the like, which are transmitted from the host 102, in the command queue 56. Thereafter, the host interface 132 may estimate or predict what type of internal operations the controller 130 will perform according to the characteristics of the commands, the data, and the like, which have been transmitted from the host 102. The host interface 132 may determine a processing order and a priority of commands, data and the like based on their characteristics.

According to the characteristics of the commands, the data, and the like transmitted from the host 102, the buffer manager 52 in the host interface 132 is configured to determine whether the buffer manager 52 should store the commands, the data, and the like in the memory 144, or whether the buffer manager 52 should deliver the commands, the data, and the like to the flash translation layer (FTL) 240. The event queue 54 receives events, transmitted from the buffer manager 52, which are to be internally executed and processed by the memory system 110 or the controller 130 in response to the commands, the data, and the like, and delivers the events to the flash translation layer (FTL) 240 in the order of the events input to the event queue 54.

In accordance with an embodiment, the flash translation layer (FTL) 240 illustrated in FIG. 3 may implement a multi-thread scheme to perform data input/output (I/O) operations. A multi-thread FTL may be implemented through a multi-core processor using multi-thread included in the controller 130.

In accordance with an embodiment, the flash translation layer (FTL) 240 may include a host request manager (HRM) 46, a map manager (MM) 44, a state manager 42, and a block manager 48. The host request manager (HRM) 46 may manage the events transmitted from the event queue 54. The map manager (MM) 44 may handle or control map data. The state manager 42 may perform garbage collection (GC) or wear leveling (WL). The block manager 48 may execute commands or instructions onto a block in the memory device 150.

By way of example but not limitation, the host request manager (HRM) 46 may use the map manager (MM) 44 and the block manager 48 to handle or process requests according to read and program commands and events which are delivered from the host interface 132. The host request manager (HRM) 46 may send an inquiry request to the map manager (MM) 44 to determine a physical address corresponding to a logical address which is entered with the events. The host request manager (HRM) 46 may send a read request with the physical address to the memory interface 142 to process the read request, i.e., handle the events. In an embodiment, the host request manager (HRM) 46 may send a program request (or a write request) to the block manager 48 to program data to a specific empty page storing no data in the memory device 150, and then may transmit a map update request corresponding to the program request to the map manager (MM) 44 in order to update an item relevant to the programmed data in information of mapping the logical and physical addresses to each other.

The block manager 48 may convert a program request delivered from the host request manager (HRM) 46, the map manager (MM) 44, and/or the state manager 42 into a flash program request used for the memory device 150, in order to manage flash blocks in the memory device 150. In order to maximize or enhance program or write performance of the memory system 110, the block manager 48 may collect program requests and send flash program requests for multiple-plane and one-shot program operations to the memory interface 142. In an embodiment, the block manager 48 sends several flash program requests to the memory interface 142 to enhance or maximize parallel processing of a multi-channel and multi-directional flash controller.

In an embodiment, the block manager 48 may manage blocks in the memory device 150 according to the number of valid pages, select and erase blocks having no valid pages when a free block is needed, and select a block including the least number of valid pages when it is determined that garbage collection is to be performed. The state manager 42 may perform garbage collection to move valid data stored in the selected block to an empty block and erase data stored in the selected block so that the memory device 150 may have enough free blocks (i.e., empty blocks with no data). When the block manager 48 provides information regarding a block to be erased to the state manager 42, the state manager 42 may check all flash pages of the block to be erased to determine whether each page of the block is valid.

For example, to determine validity of each page, the state manager 42 may identify a logical address recorded in an out-of-band (OOB) area of each page. To determine whether each page is valid, the state manager 42 may compare a physical address of the page with a physical address mapped to a logical address obtained from an inquiry request. The state manager 42 sends a program request to the block manager 48 for each valid page. A map table may be updated by the map manager 44 when a program operation is complete.

The map manager 44 may manage map data, e.g., a logical-physical map table. The map manager 44 may process various requests, for example, queries, updates, and the like, which are generated by the host request manager (HRM) 46 or the state manager 42. The map manager 44 may store the entire map table in the memory device 150, e.g., a flash/non-volatile memory, and cache mapping entries according to the storage capacity of the memory 144. When a map cache miss occurs while processing inquiry or update requests, the map manager 44 may send a read request to the memory interface 142 to load a relevant map table stored in the memory device 150. When the number of dirty cache blocks in the map manager 44 exceeds a certain threshold value, a program request may be sent to the block manager 48, so that a clean cache block is made and a dirty map table may be stored in the memory device 150.

When garbage collection is performed, the state manager 42 copies valid page(s) into a free block, and the host request manager (HRM) 46 may program the latest version of the data for the same logical address of the page and concurrently issue an update request. When the state manager 42 requests the map update in a state in which the copying of the valid page(s) is not completed normally, the map manager 44 might not perform the map table update. This is because the map request is issued with old physical information when the state manger 42 requests a map update and a valid page copy is completed later. The map manager 44 may perform a map update operation to ensure accuracy when, or only if, the latest map table still points to the old physical address.

Figure 4:
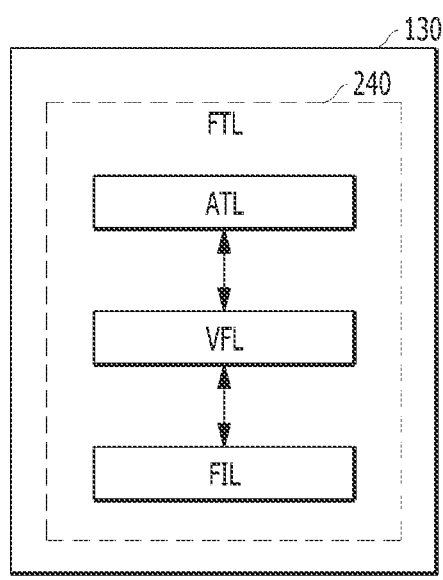
FIG. 4 illustrates internal configuration of a controller shown in FIGS. 1 to 3 according to embodiments of the present disclosure.

FIG. 4 illustrates internal configuration of the controller shown in FIGS. 1 to 3 according to an embodiment of the present disclosure.

Referring to FIG. 4, the flash translation layer (FTL) 240 in the controller 130 can be divided into three layers: an address translation layer ATL; a virtual flash layer VFL; and a flash Interface Layer FIL.

For example, the address translation layer ATL may convert a logical address LA transmitted from a file system into a logical page address. The address translation layer ATL can perform an address translation process regarding a logical address space. That is, the address translation layer ATL can perform an address translation process based on mapping information in which the logical page address LPA of the flash memory 140 is mapped to the logical address LA transmitted from the host. Such logical-to-logical address mapping information (hereinafter referred to as L2L mapping) may be stored in an area in which metadata is stored in the memory device 150.

The virtual flash layer VFL may convert the logical page address LPA, which is mapped by the address translation layer ATL, into a virtual page address VPA. Here, the virtual page address VPA may correspond to a physical address of a virtual memory device. That is, the virtual page address VPA may correspond to the memory block 60 in the memory device 150. If there is a bad block among the memory blocks 60 in the memory device 150, the bad block may be excluded by the virtual flash layer VFL. In addition, the virtual flash layer VFL can include a recovery algorithm for scanning a scan area to restore the logical-to-virtual address mapping information (L2V mapping) stored in the memory device 150 and mapping information in the data region for storing user data. The recovery algorithm can be capable of recovering the logical-to-virtual address mapping information (L2V mapping). The virtual flash layer VFL may perform an address conversion process regarding the virtual address space, based on the logical-to-virtual address mapping information (L2V mapping) restored through the recovery algorithm.

The flash interface layer FIL can convert a virtual page address of the virtual flash layer VFL into a physical page address of the memory device 150. The flash interface layer FIL performs a low-level operation for interfacing with the memory device 150. For example, the flash interface layer FIL can include a low-level driver for controlling hardware of the memory device 150, an error correction code (ECC) for checking and correcting an error in data transmitted from the memory device 150, and a module for performing operations such as Bad Block Management (BBM).

Figure 5:
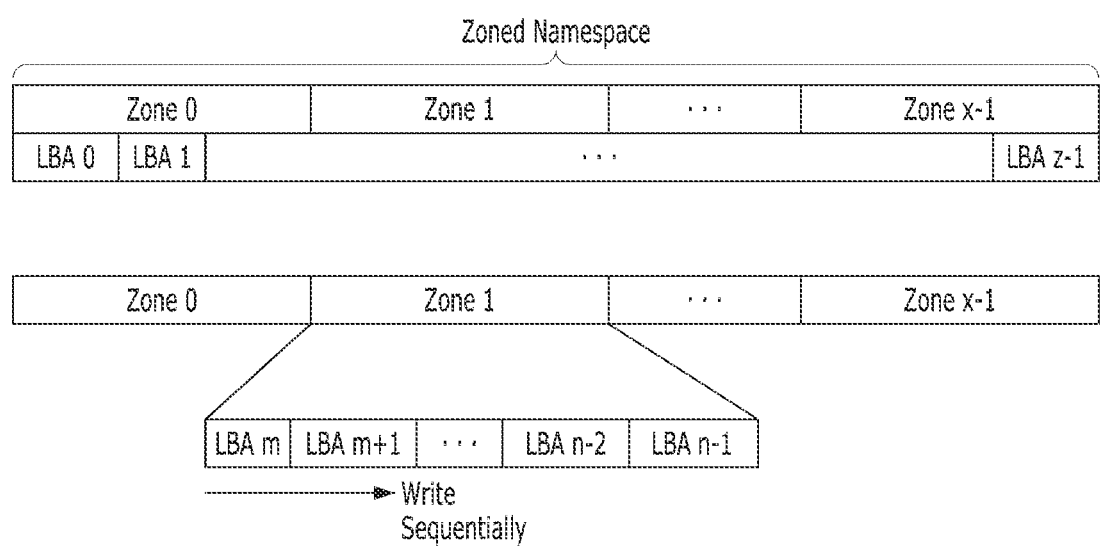
FIG. 5 illustrates a memory system supporting a namespace scheme divided by plural zones according to an embodiment of the present disclosure.

FIG. 5 illustrates a memory system supporting a namespace scheme divided by plural zones.

Referring to FIG. 5, the host 102 can divide a storage space of the memory system 110 into a plurality of zones (Zone 0, Zone 1, . . . , Zone x−1). For example, the memory system 110 has a storage space of 1G byte, and 10 zones are established. Each of the 10 zones can have a size of 100M byte.

Logical block addressing is a type of addressing system used to designate a location of a data block stored in a storage device that interworks with a computing device. The logical block addressing can be used as a system adopting a simple linear address scheme for using a storage device such as the memory system 110. Prior to the logical block addressing, conventional hard drives, which are storage devices, were accessed through an address of cylinder, head, sector (CHS) or extended CHS. That is, data stored in the hard drive could be accessed by specifying the cylinder, head, and sector addresses. In contrast, the logical block addressing (LBA) has been incorporated into the EIDE/IDE interface as a method of addressing sectors. Instead of being accessed by reference to cylinder, head, and sector numbers of the hard drive, the logical block addressing can assign a unique sector number to each sector. For example, a logical block address (LBA) is a scheme that accesses a drive by linearly addressing the plural sectors, starting from sector 0 of head 0 of cylinder 0 in the drive with LBA 0 to the last physical sector of the last head of the last cylinder in the drive with the last LBA. For example, the number of logical block addresses (LBAs) in the 540M Byte storage device can be 1,065,456.

The storage space of the memory system 110 supporting the namespace scheme can be allocated for the plurality of zones (Zone 0, Zone 1, . . . , Zone x−1). The storage space can be distinguished by blocks designated by a plurality of logical addresses (LBA 0, LBA 1, . . . , LBA z−1). In the zoned namespace (ZNS), logical addresses of a specific range may be allocated to each zone (Zone 0, Zone 1, . . . , Zone x−1). For example, an (m+1)th logical block address (LBA m) to an n-th logical block address (LBA n−1) can be allocated to the second zone (Zone 1). An application program using the second zone (Zone 1) in the host 102 can sequentially assign a logical block address between the (m+1)th logical block address (LBA m) and the n-th logical block address (LBA n−1) to data which could be transferred to, and stored in, the memory system 110 (Write Sequentially).

Figure 6:
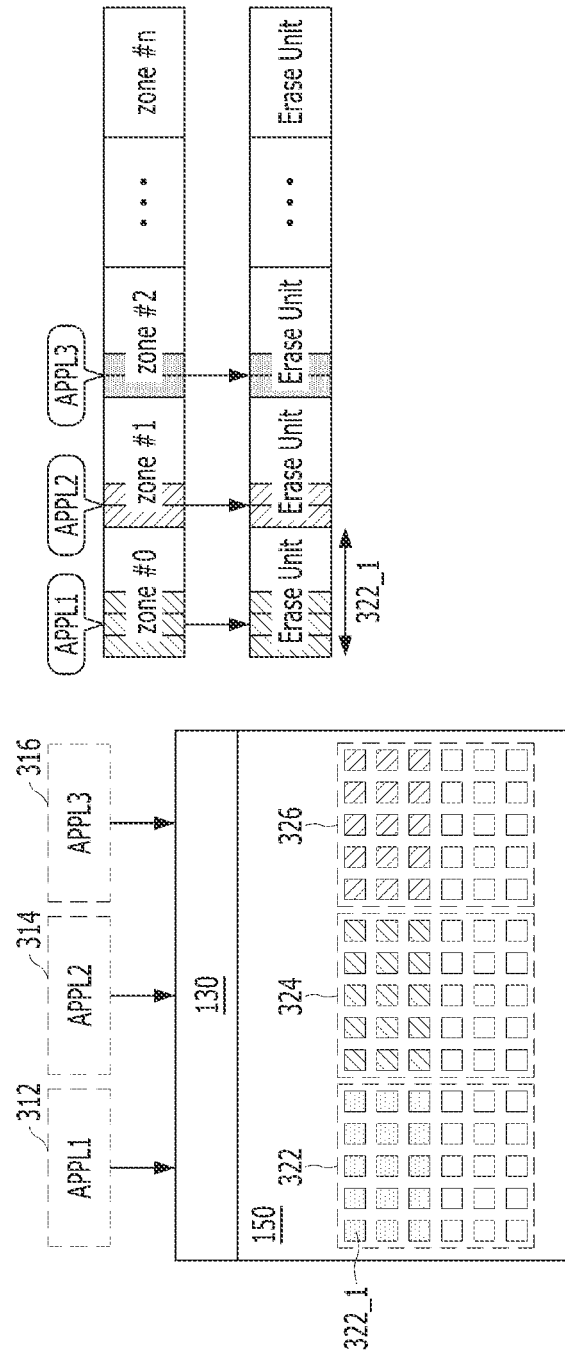
FIG. 6 illustrates a memory system including a non-volatile memory device supporting a namespace divided by plural zones according to an embodiment of the present disclosure.

FIG. 6 illustrates a memory system including a non-volatile memory device supporting a namespace divided by plural zones.

Referring to FIG. 6, a plurality of applications 312, 314, 316 executed in the host 102 (refer to FIGS. 2 to 3) can use ZNS to request data I/O operation of the controller 130. A plurality of memory blocks included in the memory device 150 may be allocated for each of three ZNSs 322, 324, 326.

A memory block 322_1 allocated for a first ZNS 322 will be described. Herein, the memory block 322_1 may be considered a group of memory cells which are erased together at a time by an erase operation. A first application (APPL1, 312) can use the first ZNS (322, zone #0). The ZNS can reduce influence which occurs from a difference between a logical address scheme used by the host 102 and a physical address scheme used in the memory device 150. The first application (APPL1, 312) may generate data and assign, to the data, a specific logical address in a range of logical addresses, assigned to the first ZNS (322, zone #0). Such data generated by the first application (APPL1, 312) may be sequentially stored in the memory block 322_1 allocated for the first applications (APPL1, 312).

Each of the plurality of applications 312, 314, 316 may use a designated or assigned ZNS among the plurality of ZNSs zone #0, zone #1, zone #3, . . . , zone #n. As described in FIG. 1, according to an embodiment, the plurality of ZNSs may be allocated for one application. According to an embodiment, the plurality of applications 312, 314, 316 may share a single ZNS. In a logical address scheme, different ranges of logical addresses can be assigned in advance to each of the plurality of ZNSs zone #0, zone #1, zone #3, . . . , zone #n, which individually corresponds to the plurality of applications 312, 314, 316. Each of the plurality of applications 312, 314, 316 might not use undesignated or unassigned ones of the plurality of ZNSs zone #0, zone #1, zone #3, . . . , zone #n. That is, a logical address pre-allocated to a specific ZNS may not be used by other applications using other ZNSs among the plurality of ZNSs zone #0, zone #1, zone #3, . . . , zone #n. When a ZNS is not shared by plural applications, this scheme of ZNS can avoid a phenomenon in which data generated by the plural applications may be mixed and jumbled in a single memory block, which is common in a conventional non-volatile memory device.

In a scheme using different addresses such as a logical address and a physical address, both a logical address and a physical address are sequentially assigned to data items generated by an application, thereby making it easier to perform garbage collection. According to an embodiment, the host 102 may change storage spaces allocated for the ZNSs zone #0, zone #1, zone #3, . . . , zone #n. At least some unallocated memory blocks in the memory device 150 may be additionally allocated to the ZNSs 322, 324, 326.

According to an embodiment, when all data stored in a specific ZNS is deleted or when the specific ZNS is not further used, the host 102 may notify the memory system 110. The memory system 110 may deactivate the specific ZNS according to a notification input from the host 102, perform an erase operation on memory blocks allocated for the specific ZNS, or initialize setting values for the memory blocks allocated for the specific ZNS. In response to a request input from the host 102, the memory system 110 can deactivate a specific ZNS in which no data is stored, or additionally allocate a memory block, which is not allocated for any ZNS, for the specific ZNS.

For example, the host 102 can execute a plurality of applications APPL1, APPL2, APPL3, and the plurality of applications APPL1, APPL2, APPL3 can generate data items, individually, and store the generated data items in the memory system 110.

First, in the conventional non-volatile memory system, data items input from a host 102 are sequentially stored in a memory block within the memory device. That is, data items generated by the plurality of applications APPL1, APPL2, APPL3 may be sequentially stored in the memory device, without separation or distinction, according to an order of the data items which have been transferred from the host 102 to the conventional non-volatile memory system. The data items generated by the plurality of applications APPL1, APPL2, APPL3 may be sequentially stored in a memory block opened for programming data within the memory device. In the memory block, the data items generated by the plurality of applications APPL1, APPL2, APPL3 can be mixed or jumbled. In these processes, the controller is configured to generate map data items, each associating a logical address input from the host 102 with a physical address indicating a location where data is stored in the memory device. Thereafter, when the plurality of applications APPL1, APPL2, APPL3 executed by the host 102 requests data items stored in the memory system, the controller can output the data items requested by the plurality of applications APPL1, APPL2, APPL3 based on the map data items.

In the conventional non-volatile memory system, various types of data items generated by various applications may be mixed or jumbled in a single memory block. In this case, data items stored in the single memory block (valid data is the latest data) can have different validity, and it may be difficult to predict validity of data items. Due to this reason, when garbage collection is performed, a lot of resources may be consumed to select a valid data item or to check whether the data items are valid. In addition, because plural applications are associated with a single memory block, a data input/output operation requested by one of the plural applications may be delayed by another operation requested or caused by another application. When garbage collection is performed on the memory block, plural operations requested by the plural applications may be delayed. However, the ZNS can avoid or prevent above-described issues which occur in the conventional non-volatile memory system.

In a scheme of the ZNS, the plurality of applications APPL1, APPL2, APPL3 may sequentially store data items in respectively assigned zoned namespaces ZNS1, ZNS2, ZNS3. Here, the zone may have a predetermined storage space corresponding to a logical address scheme used by the host 102. Plural memory blocks included in the memory device 150 may be allocated for individual zones. Referring to FIG. 6, the plurality of zoned namespaces ZNS1, ZNS2, ZNS3 can correspond to the plurality of applications APPL1, APPL2, APPL3 included in the memory device 150. A data item associated with the first application (APPL1, 312) can be programmed in, or read from, a memory block allocated for the first zoned namespace (ZNS1, 322). The second application (APPL2, 314) can store a data item in, or read a data item from, another memory block allocated for the second zoned namespace (ZNS2, 324). In addition, the third applications (APPL3, 316) may store a data item in, or read a data item from, another memory block allocated for the third zoned namespace (ZNS3, 326).

In this case, data items generated by the first application APPL1 are sequentially stored in a memory block allocated for the first zoned namespace ZNS1, so that the memory system 110 does not have to check another memory block allocated for ZNSs other than first zoned namespace ZNS1 among the plurality of zoned namespaces ZNS1, ZNS2, ZNS3 for performing a data input/output operation or garbage collection. In addition, until a storage space in the first zoned namespace ZNS1 allocated to the first application APPL1 becomes insufficient to store data, garbage collection need not be performed on the memory blocks allocated for the first zoned namespace ZNS1. For this reason, efficiency of garbage collection for the memory device 150 may increase, and a frequency of performing the garbage collection may decrease. This can lead to a decrease in a write amplification factor (WAF) indicating a degree to which an amount of data write (or data program) is amplified in the memory device 150, and increase a lifespan of the memory device 150. In addition, in the memory system 110 to which the ZNS is applied, media over-provisioning in the memory device 150 can be reduced, as well as a utilization (or occupancy) rate of the volatile memory 144 (refer to FIGS. 2 to 3) can be reduced. It is possible to reduce the amount of data processed, transmitted, or received within the memory system 110, so that overheads generated in the memory system 110 might decrease. Through this, performance of the data input/output operation of the memory system 110 may be improved or enhanced.

According to an embodiment, the plurality of zoned namespaces ZNS1, ZNS2, ZNS3 may be individually allocated for each of the plurality of applications APPL1, APPL2, APPL3. In another embodiment, the plurality of applications APPL1, APPL2, APPL3 may share a specific ZNS. In addition, in another embodiment, plural ZNSs are allocated for each of a plurality of applications APPL1, APPL2, APPL3. Each of the applications APPL1, APPL2, APPL3 can use the plural ZNSs according to characteristics of data to be stored in the memory system 110. For example, when the first zoned namespace ZNS1 and the second zoned namespace ZNS2 are allocated for the first application APPL1, the first application APPL1 can store a hot data item (e.g., a data item frequently accessed or read, or updated) in the first zoned namespace ZNS1, and store a cold data item (e.g., a data item less frequently accessed or read, or updated) in the second zoned namespace ZNS2. The hot data item is more frequently read, updated or re-programmed than the cold data item, so that a validity period of the host data item is shorter than that of the cold data item.

During an initial operation for engagement between the host 102 and the memory system 110, the host 102 and the memory system 110 may exchange information regarding ZNSs allocated for the respective applications APPL1, APPL2, APPL3. A data input/output operation may be performed for each of the applications APPL1, APPL2, APPL3 through a corresponding ZNS. Depending on the characteristics of data during the data input/output operation or the characteristics of applications, the host 102 can require a faster data input/output speed of the memory system 110, or securely store a data item with a very high priority in the memory system 110.

Furthermore, a plurality of non-volatile memory cells included in the memory device 150 may include memory cells, each memory cell storing multi-bit data. But the memory system 110 can adjust the memory cell to store one-bit data. When a fast input/output speed is required or data should be safely stored, the memory system 110 may adjust a memory block including memory cells to store one-bit data in each memory cell although the memory cells are capable of storing multi-bit data. Further, if necessary, a specific memory block in the memory device 150 may be used as a single-level cell (SLC) buffer for a fast data input/output operation or data safety. Sometimes, the memory system 110 can adjust the number of bits of data stored in the memory cell for wear leveling. Due to various reasons, after the host 102 and the memory system 110 set the ZNS and exchange information regarding the set ZNS with each other, the memory system 110 might independently change the number of bits of data stored in the memory cell included in the memory block allocated for the ZNS. However, it could be an issue that a preset storage capacity of the ZNS would be changed when the number of bits of data stored in the memory cell included in the memory block allocated for the already set ZNS is changed.

Figure 7:
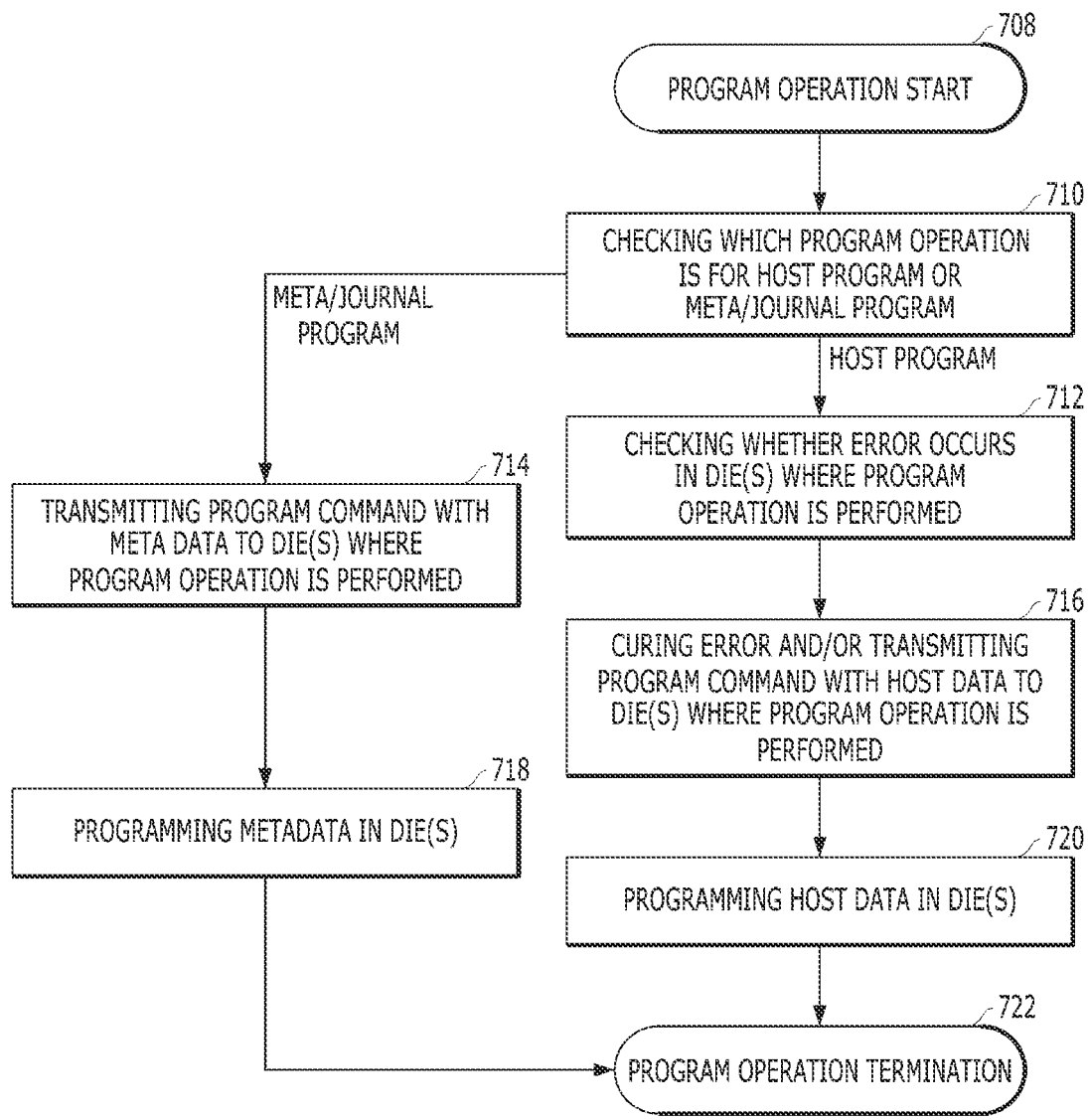
FIG. 7 illustrates a method for operating a memory system according to an embodiment of the present disclosure.

FIG. 7 illustrates a method for operating a memory system according to an embodiment of the present disclosure.

Referring to FIG. 7, the method for operating the memory system 110 can include starting a program operation (operation 708). When receiving a write request with write data to be stored in the memory device 150 from the host 102, which is an external device, or generating the metadata used to control or manage an internal operation of the memory system 110, an event or a trigger for the program operation could be generated.

The memory system 110 can check or determine whether the program operation is for storing host data in the memory device 150 in response to the write request of the host 102 (e.g., a host operation) or storing the metadata of the memory system 110 (operation 710).

When the program operation relates to the host data (HOST PROGRAM), the memory system 110 can check an operation state regarding a memory die, a memory plane, or a memory block on which the program operation is to be performed (operation 712). For example, the memory system 110 can store the host data in a memory block, a memory plane, or a memory die allocated for a zone corresponding to a logical address associated with the host data. The host data and the logical address are input from the host 102. The memory system 110 can check whether an error has occurred in the memory block, the memory plane, or the memory die in which the host data is stored, or whether the error is recovered or corrected, in order to determine the operation state regarding the memory block, the memory plane, or the memory die before transferring the host data to the corresponding location (operation 712).

When no error occurs in the memory block, the memory plane, or the memory die in which the host data is stored, the memory system 110 can transfer the host data to the memory block, the memory plane, or the memory die (operation 716). When an error occurs in the memory block, the memory plane, or the memory die in which the host data is stored, the memory system 110 can correct and recover the error first, and then the memory system 110 can transfer the host data to the memory block, the memory plane, or the memory die (operation 716). The memory system 110 supporting the zoned namespace scheme can sequentially store the host data transmitted from the host 102 corresponding to the logical address associated with the host data. Moreover, if an error occurs at a specific location in the memory device 150, it might be difficult to sequentially program the host data in a storage region corresponding a zone. To support the zoned namespace scheme, the memory system 110 can sequentially program the host data after the corresponding storage region is restored or recovered from the error. To this end, the host data can be obstructed or blocked from being transmitted to the memory device 150 until the error is corrected or recovered in the memory device 150. When the error is corrected or recovered, the memory system 110 can transfer the host data to the memory device 150.

When the host data is transferred to the memory die, the memory plane, or the memory block in the memory device 150, the memory device 150 can sequentially program the host data therein (operation 720). For example, 10 pages are included in a specific memory block allocated to a specific zone. When data has been stored in three pages in a specific memory block allocated to the corresponding zone, a write pointer of the corresponding zone can point to the fourth page among the 10 pages in the memory block. When another host data corresponding to another logical address of the corresponding zone is received, the memory system 110 can store the host data in the fourth page. However, when an error occurs in the corresponding memory block, the memory device 150 can replace the memory block in which the error occurs with another memory block. To this end, after migrating the data of first three pages stored in the memory block in which the error occurs to a new memory block, the memory system 110 can store the received host data at the fourth page of the new memory block.

When the program operation relates to the metadata (MATA/JOURNAL PROGRAM), the memory system 110 can transmit the meta data to a memory die, a memory plane, or a memory block on which the program operation is to be performed (operation 714). As above described, the host data and the metadata can be distinguished from each other by the memory system 110 adopting the zoned namespace scheme. The host data should be sequentially programmed in a storage region allocated to the zone corresponding to the logical address, but there may be no restrictions on a location where the metadata is stored in the memory device 150. Because the metadata can be stored at an arbitrary location or at a preset location in the memory device 150, the metadata can be transmitted to the memory device 150 regardless of an error occurring in a specific memory block, a specific memory plane, or a specific memory die allocated to a zone, unlike the host data (operation 714). When the metadata is transmitted to the memory device 150, the memory device 150 can program the metadata (operation 718).

For example, even when an error occurs in a memory block, a memory plane, or a memory die which is a location for storing metadata in the memory device 150, the memory system 110 can transmit the metadata. The memory system 110 does not have to await transmission of the metadata until the error is corrected and recovered. For example, metadata from a first page to a third page can be stored in a specific memory block included in the memory device 150, and the memory system 110 can try to store new metadata in the fourth page of the same memory block. When an error occurs in the fourth page, the memory system 110 can store the new metadata in the fifth page, not the fourth page, because there is no restriction to sequentially store metadata in a storage region. Accordingly, an operation for storing the metadata can be different from that for storing the host data. Even when an error occurs in a location prearranged for storing the metadata, the memory system 110 might not await transmission or program of metadata until the error is corrected or recovered.

Figure 8:
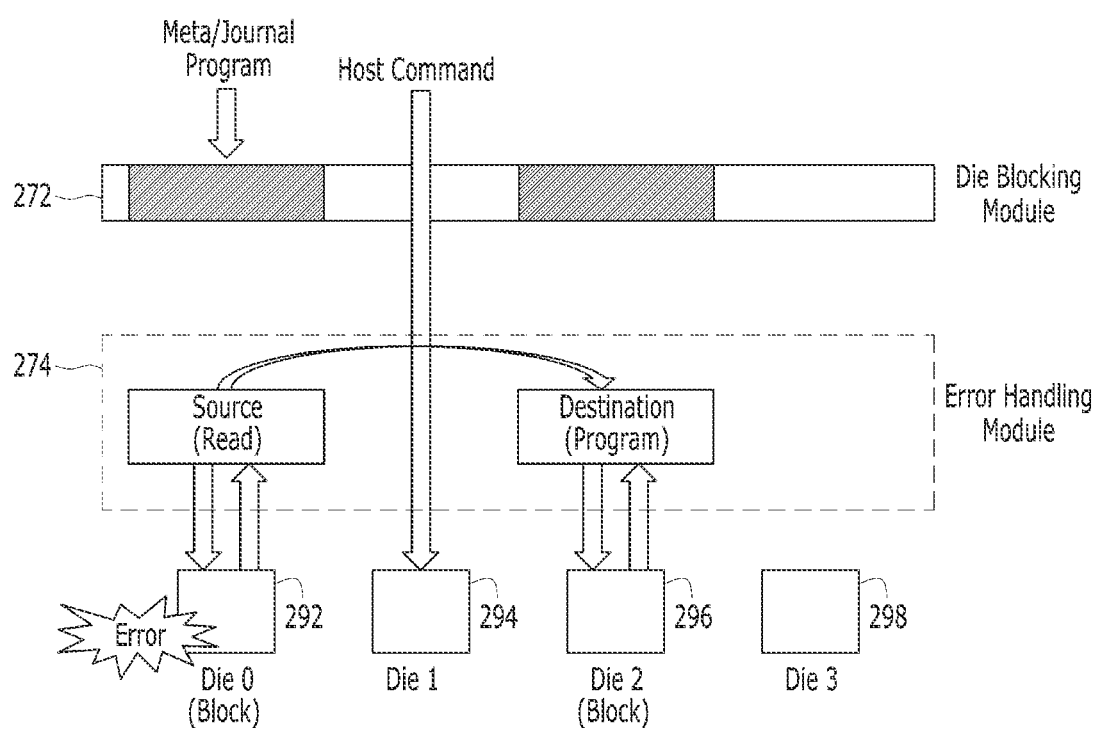
FIG. 8 illustrates a first example of a program operation method in accordance with an operation state of a memory die according to an embodiment of the present disclosure.

FIG. 8 illustrates a first example of a program operation method in accordance with an operation state of a memory die according to an embodiment of the present disclosure. In FIG. 8, a case in which four memory dies 292, 294, 296, 298 are included in the memory device 150 will be described as an example.

Referring to FIG. 8, the memory system 110 supporting the zoned namespace scheme can include a die blocking module 272 and an error handling module 274. According to an embodiment, the die blocking module 272 and the error handling module 274 can be included in the input/output control module 260 described with reference to FIG. 1. Also, in another embodiment, the die blocking module 272 can be included in the input/output control module 260, and the error handling module 274 can be included in the memory interface 142.

The die blocking module 272 can obstruct data transferred to the four memory dies 292, 294, 296, 298 according to operating states of the four memory dies 292, 294, 296, 298. Referring to FIG. 8, an error occurs in the first memory die (Die 0) 292. The error handling module 274 can read data stored in the first memory die (Die 0) 292 in order to correct and recover an error occurring in the first memory die (Die 0) 292, and then store the data stored in the first memory die (Die 0) 292 in the third memory die (Die 2) 296. Herein, a range of reading data in the first memory die (Die 0) 292 can vary based on a type of the error, a recoverable range of the error, or the like. While the error occurred in the first memory die (Die 0) 292 is corrected or recovered, it might be difficult to perform an operation for storing new data in the first memory die (Die 0) 292 as well as the third memory die (Die 2) 296 in the memory device 150. The error handling module 274 can inform the die blocking module 172 of the error (e.g., which type of error occurs, which memory die is used to recover or correct the error, or the like). While the error handling module 274 checks the error and corrects and recovers the error, the die blocking module 272 receiving information about the error from the error processing module 274 can obstruct or block transmission of data to the first memory die (Die 0) 292 and the third memory die (Die 2) 296. In FIG. 8, a program operation (Meta/Journal Program) of meta data to be stored in the first memory die (Die 0) 292 is blocked or obstructed, so that the program operation for the metadata could be delayed.

The second memory die (Die 1) 294 is not used by the error handling module 274 for checking an error and correcting and recovering the error. The die blocking module 272 might not block or obstruct a host command to be performed on the second memory die (Die 1) 294. Accordingly, the host command could be transmitted to the second memory die (Die 1) 294, so that the second memory die (Die 1) 294 can perform a data input/output operation corresponding to the host command.

Figure 9:
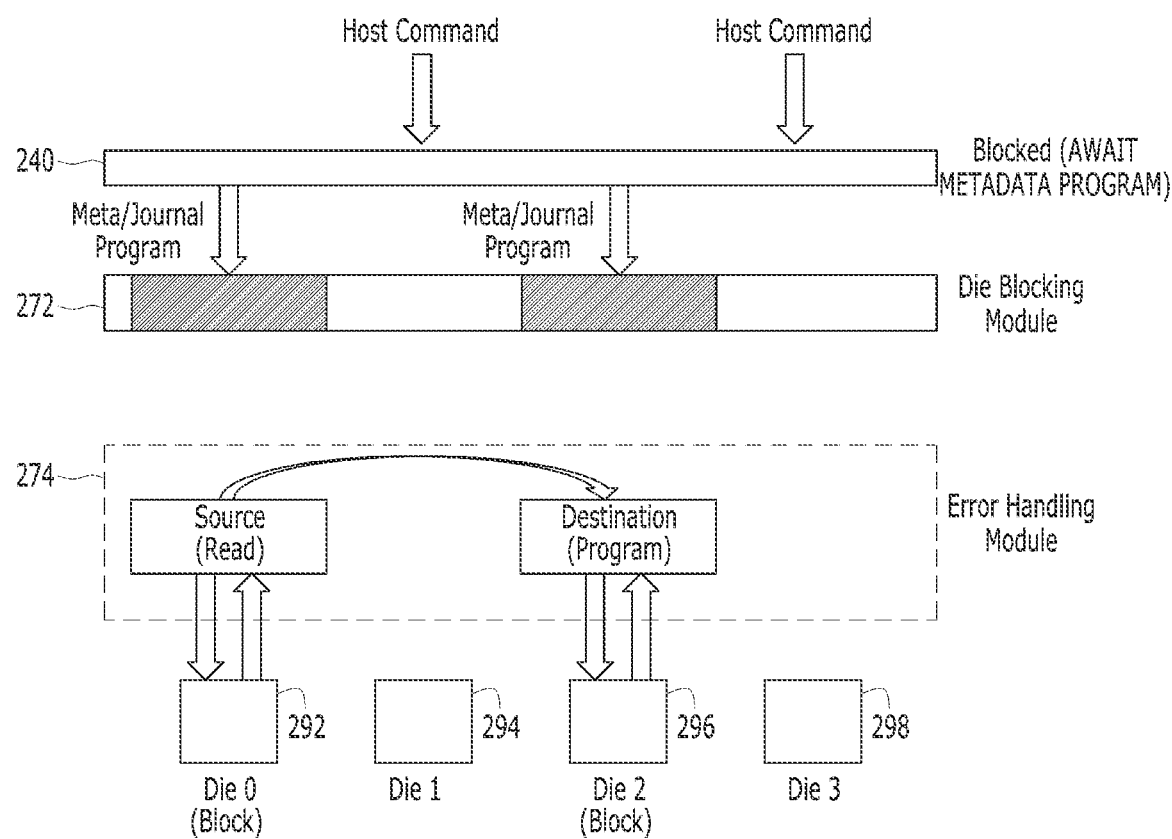
FIG. 9 illustrates a second example of the program operation method in accordance with the operation state of the memory die according to an embodiment of the present disclosure.

FIG. 9 illustrates a second example of the program operation method in accordance with the operation state of the memory die according to an embodiment of the present disclosure. FIG. 9 illustrates another operation in a case where the memory system 110 recovers or corrects an error occurring in a first memory die (Die 0) 292 by reading data stored in the first memory die (Die 0) 292 and storing the read data from the first memory die (Die 0) 292 in a third memory die (Die 2) 296, like the operating environment shown in FIG. 8.

Referring to FIG. 9, while the error handling module 274 corrects or recovers an error occurring in the first memory die (Die 0) of the memory device 150, it is difficult to perform an operation (Meta/Journal Program) for storing metadata, which is new data, in the first memory die (Die 0) 292 and the third memory die (Die 2) 296 used by the error handing module 274. Accordingly, the memory system 110 can obstruct or block transmission of the metadata to the first memory die (Die 0) 292 and the third memory die (Die 2) 296, so that execution of an operation for storing the metadata (Meta/Journal Program) could be delayed.

Further, as the execution of the operation for storing metadata (Meta/Journal Program) is delayed, execution of a program operation corresponding to a host command could be delayed. For example, the controller 130 can generate metadata (e.g., map data connecting a logical address and a physical address) whenever the host data or migrated or copied data is programmed in the memory device 150. The controller 130 can temporarily store the metadata in the memory 144 (e.g., a buffer allocated for the map data). When the buffer (or a memory region) for the metadata or the map data (e.g., a map table stored in the memory 144) is full, the controller 130 can perform a map update or a map flush so that the map data is programmed in the memory device 150 and the buffer or map table could be erased or empty. As shown in FIG. 9, when the operation for storing metadata in the memory device 150 such as map update or map flush (Meta/Journal Program) is delayed, controller's operation (e.g., map data generation performed in response to a host command by the flash conversion layer 240 to store new data input from the host 102 in the memory device 150) might be awaited or delayed. In this case, data input/output performance of the memory system 110 might deteriorate.

Figure 10:
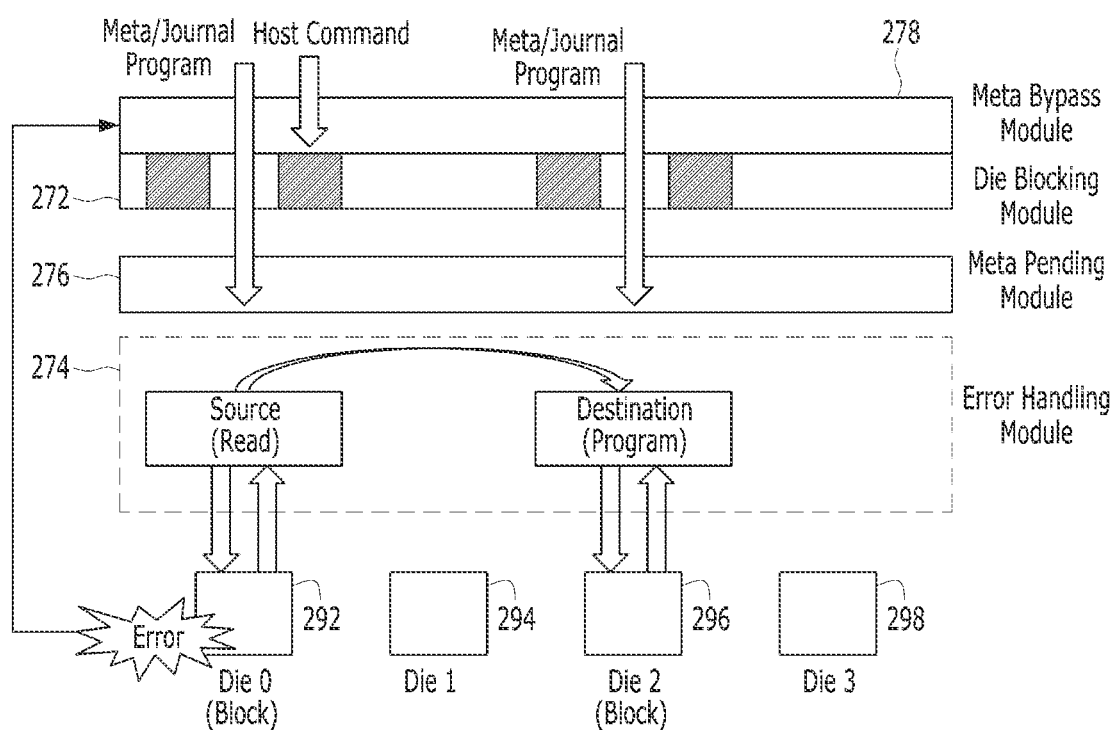
FIG. 10 illustrates a third example of the program operation method in accordance with the operation state of the memory die according to an embodiment of the present disclosure.

FIG. 10 illustrates a third example of the program operation method in accordance with the operation state of the memory die according to an embodiment of the present disclosure. FIG. 10 illustrates another operation in a case where the memory system 110 recovers or corrects an error occurring in a first memory die (Die 0) 292 by reading data stored in the first memory die (Die 0) 292 and storing the read data from the first memory die (Die 0) 292 in a third memory die (Die 2) 296, like the operating environment shown in FIG. 8.

Referring to FIG. 10, the memory system 110 can include a metadata bypassing module 278 and a metadata pending module 276. A die blocking module 272 can be disposed between the metadata passing module 278 and the metadata pending module 276. While the error handling module 274 corrects and recovers an error occurring in the first memory dies (Die 0) 292 in the memory device 150, the die blocking module 272 can obstruct or block transmission of any data to the first memory die (Die 0) 292 and the third memory die (Die 2) 296 which are accessed by the error handing module 274 for an error recovery and correction procedure. However, the metadata bypassing module 278 can allow the metadata to bypass the die blocking module 272 so that the metadata to be stored in the first memory dies (Die 0) 292 and the third memory dies (Die 2) 296 could be transmitted for an operation for storing the metadata in the memory device 150 (Meta/Journal Program). That is, the metadata to be programmed in the memory device 150 can be allowed to bypass the die blocking module 272 by the metadata bypassing module 278, but the host data to be programmed in the memory device 150 in response to a host command might not be allowed to bypass the die blocking module 278. The host data program operation could be delayed by the die blocking module 272.

In FIG. 10, an operation for storing metadata transmitted to the first memory die (Die 0) 292 and the third memory die (Die 2) 296 (Meta/Journal Program) can be performed by the metadata bypassing module 278 which allows the metadata to bypass the die blocking module 272. An operation for storing the metadata that has bypassed the die blocking module 272 (Meta/Journal Program) can be queued in the metadata pending module 276. The error handling module 274 can read data stored in the first memory die (Die 0) 292 and then store read data from the first memory die (Die 0) 292 in the third memory die (Die 2) 296, in order to correct or recover the error occurring in the first memory die (Die 0) 292. When an error recovery and correction operation performed in the first memory die (Die 0) 292 is terminated, the operation for storing the metadata (Meta/Journal Program) awaited by the metadata pending module 276 can be performed on the first memory die (Die 0) 292. That is, the metadata awaited by the metadata pending module 276 can be transferred to the first memory die (Die 0) 292, and the first memory die (Die 0) 292 can program transferred metadata therein (e.g., a page or a memory block included in the first memory die (Die 0) 292). Similarly, when an error recovery and correction operation performed in the third memory die (Die 2) 296 is terminated, the operation for storing the metadata (Meta/Journal Program) awaited by the metadata pending module 276 can be performed in the third memory die (Die 3) 296. That is, the metadata awaited by the metadata pending module 276 is transferred to the third memory die (Die 3) 296, and the third memory die (Die 3) 296 can program the transferred metadata therein.

Referring to FIGS. 9 and 10, while the metadata bypassing the die blocking module 272 is awaited by the metadata pending module 276, the controller 130 can receive new host data input along with a host command, and the flash translation layer 240 can perform an operation for storing the new host data in the memory device 150. It is possible to avoid that the flash translation layer 240 should await or postpone the operation for the new host data, because the metadata has been transferred to the metadata pending module 276 and the flash translation layer 240 can use a buffer for the metadata such as map table in the memory 144 (e.g., map data flush or map data update in progress).

For example, if the new host data input along with the host command is programmed in the second memory die (Die 1) or the fourth memory die (Die 3), the new host data can bypass the die blocking module 272 so that the new host data can be transferred to the second memory die (Die 1) or the fourth memory die (Die 3). After being transferred to the second memory die (Die 1) or the fourth memory die (Die 3), the new host data can be programmed in the second memory die (Die 1) or the fourth memory die (Die 3) without a delay caused due to an error occurring in another memory die such as the first memory die (Die 0). Otherwise, if the new host data input along with the host command is programmed in the first memory die (Die 0) or the third memory die (Die 2), the new host data might not bypass the die blocking module 272. However, the flash translation layer 240 can perform an operation for the new host data without the delay. When the error recovery and correction operation performed in the first memory die (Die 0) 292 or the third memory die (Die 2) 296 by the error handling module 274 is terminated, the new host data obstructed or blocked by the die block module 272 can be released, and the new host data can be transferred to the first memory die (Die 0) or the third memory die (Die 2), so that the first memory die (Die 0) or the third memory die (Die 2) can program the new host data therein.

Figure 11:
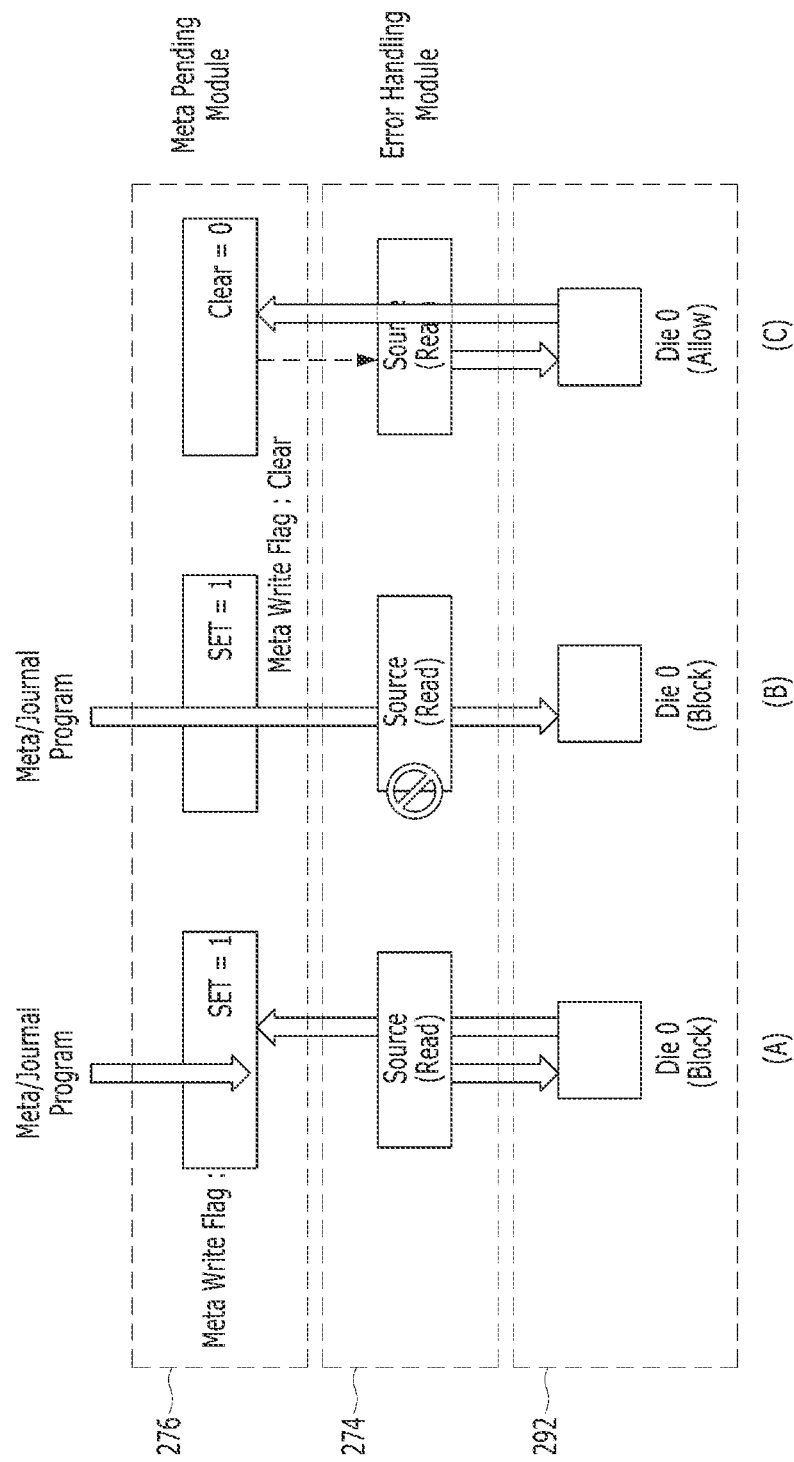
FIG. 11 illustrates a program operation method in accordance with an indicator added to a program command according to an embodiment of the present disclosure.

FIG. 11 illustrates a program operation method in accordance with an indicator added to a program command according to an embodiment of the present disclosure. Specifically, three cases (A), (B), (C) of FIG. 11 describe different operations for storing metadata (Meta/Journal Program) or storing or reading host data according to an operating state of the first memory die (Die 0) 292 in the memory device 150.

Referring to FIGS. 8, 10, and the case (A) of FIG. 11, an operation of recovering and correcting an error occurring in the first memory die (Die 0) 292 can be started due to an error occurring in the first memory die (Die 0) 292. The error handling module 274 can read data stored in the first memory die (Die 0) 292 and migrate the data to another location to recover the error. While the error in the first memory die (Die 0) 292 is corrected or recovered by the error handling module 274, the first memory die (Die 0) 292 is busy so that a program operation for new data could not be performed in the first memory die (Die 0) 292. In order that the new data transferred to the first memory die (Die 0) 292 is awaited by the metadata pending module 276, the first memory die (Die 0) 292 can activate or enable the metadata pending module 276 (SET=1) which is used to control the metadata pending module 276. The first memory die (Die 0) can transmit an operation status to the metadata pending module 276 through the meta write flag. The metadata pending module 276 can be activated in response to the operating state of the first memory die (Die 0) 292, and the metadata pending module 276 can hold data transferred to the first memory die (Die 0) 292 (i.e., no data transmission to the first memory die (Die 0) 292).

Referring to the case (B) of FIG. 11, due to an error occurring in the first memory die (Die 0) 292, the error handling module 274 can start an operation of recovering the error in the first memory die (Die 0) 292. During an error recovery operation, the metadata pending module 276 can be activated in response to an operating state of the first memory die (Die 0) 292 (SET=1), like the case (A). Even when the metadata pending module 276 is activated, the metadata can be transferred to the first memory die (Die 0) 292 in order to perform an operation for storing the metadata (Meta/Journal Program). In this case, a meta write flag can be set to allow the metadata to bypass the metadata pending module 276 (Meta Write Flag: Clear), unlike the host data awaited by the metadata pending module 276. According to an embodiment, in response to the meta write flag, the error handling module 274 can temporarily cease or stop an operation of reading data stored in the first memory die (Die 0) 292 in order to recover an error in the first memory die (Die 0) 292.

According to an embodiment, the metadata pending module 276 can include a buffer for temporarily storing data to be transferred in response to an operating state of the first memory die (Die 0) 292. The metadata pending module 276 can control transmission or pending of data stored in the buffer in response to an operation state of a memory die, a memory plane, or a memory block included in the memory device 150. For example, while the first memory die (Die 0) 292 performs a data input/output operation, the metadata pending module 276 can hold host data to be transferred to the first memory die (Die 0) 292. However, unlike the host data, the metadata to be stored in the first memory die (Die 0) 292 can be transferred. On the other hand, when the first memory die (Die 0) 292 could not perform a data input/output operation due to an error occurring therein, the metadata pending module 276 can stop transmission of host data or metadata to the first memory die (Die 0) 292.

Referring to the case (C) of FIG. 11, when the error handling module 274 repairs or recovers errors in the first memory die (Die 0) 292, the metadata pending module 276 could be inactivated. (Clear=0). When the metadata pending module 276 is deactivated, the metadata pending module 276 can control the buffer to sequentially transfer data included in the buffer into the first memory die (Die 0) 292. When the metadata pending module 276 is deactivated, the buffer does not hold stored data so that the stored data in the buffer can be output sequentially to the memory device 150. Accordingly, if the metadata pending module 276 does not hold the metadata or the host data, the metadata or the host data processed by the flash translation layer (FTL) 240 is sequentially transferred to the first memory die (Die 0) 292, so that the first memory die (Die 0) 292 can sequentially program the transferred data therein.

Figure 12:
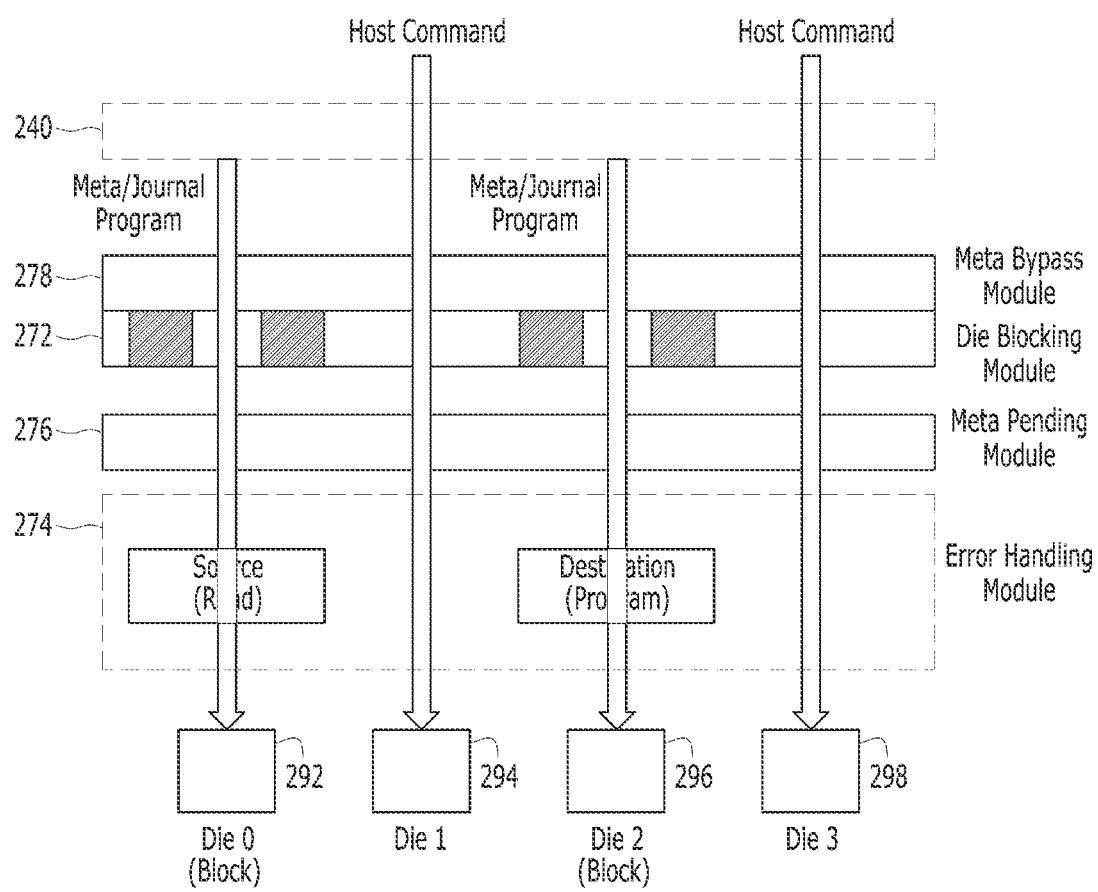
FIG. 12 illustrates an effect of a program operation method in accordance with an operation state of a memory die according to an embodiment of the present disclosure.

FIG. 12 illustrates an effect of a program operation method in accordance with an operation state of a memory die according to an embodiment of the present disclosure. As described with reference to FIGS. 10 and 11, FIG. 12 shows that the memory system 110 can include the metadata bypassing module 278, the die blocking module 272, and the metadata pending module 276. FIG. 12 shows operations in the memory system 110 when the error handing module 274 reads data stored in the first memory die (Die 0) 292 and stores the data in the third memory die (Die 2) 296 in order to correct or recover an error occurring in the first memory die (Die 0) 292, which has an operating condition similar to that of FIG. 10.

Because the first memory die (Die 0) 292 and the third memory die (Die 2) 296 are used to correct or recover the error, transmission of the host data, input with the host command, to be transferred to the first memory die (Die 0) 292 and the third memory die (Die 2) 296 can be obstructed or blocked the die blocking module 272. However, the metadata to be stored in the first memory die (Die 0) 292 and the third memory die (Die 2) 296 can be allowed to bypass the die blocking module 272 by the metadata bypassing module 278. When the first memory die (Die 0) 292 and the third memory die (Die 2) 296 are operable (e.g., the first memory die (Die 0) 292 and the third memory die (Die 2) 296 are capable of performing data input/output operations such as a read or write operation for error recovery, the metadata pending module 276 can transmit the metadata to the first memory die (Die 0) 292 and the third memory die (Die 2) 296 without holding in order to perform an operation for storing the metadata (Meta/Journal Program).

Moreover, because the second memory die (Die 1) 294 and the fourth memory die (Die 3) 298 are not used for the error recovery and correction operation, the host data which is input along with the host command can be delivered into the second memory die (Die 1) 294 and the fourth memory die (Die 3) 298. The second memory die (Die 1) 294 and the fourth memory die (Die 3) 298 can sequentially program the host data.

Referring to FIG. 12, because the meta data can be programmed in a preset position or an arbitrary position within the memory device 150 without pending, the flash translation layer (FTL) 240 can perform an operation for new data without a delay caused by pending metadata scheduled to be programmed in a die used for the error recovery and correction operation. Accordingly, data input/output performance of the memory system 110 can be improved.

Figure 13:
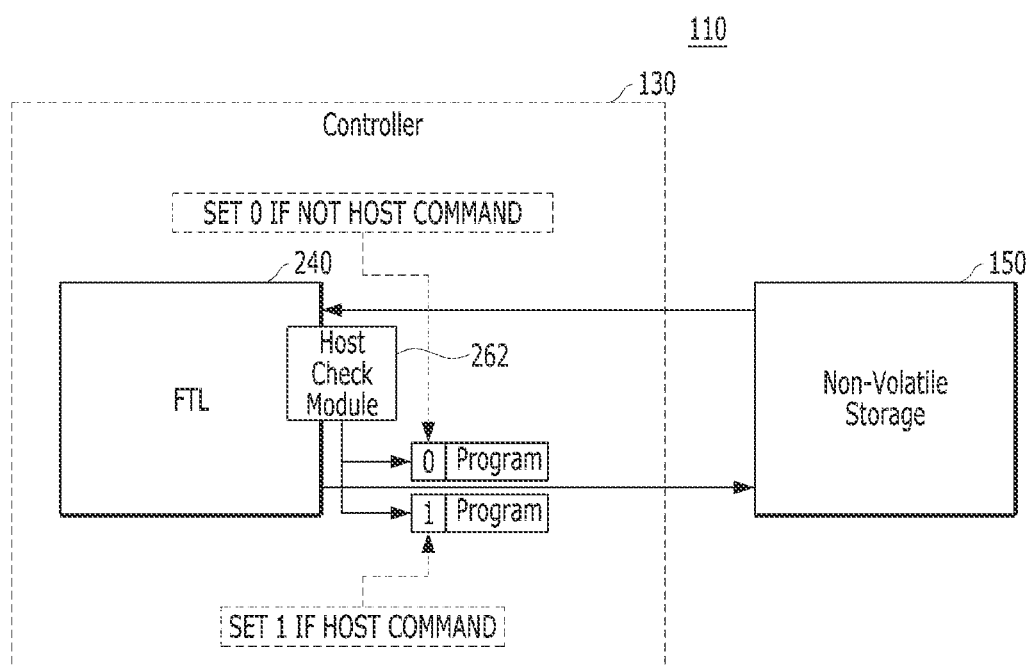
FIG. 13 illustrates a first example of a memory system according to another embodiment of the present disclosure.

FIG. 13 illustrates a first example of a memory system according to another embodiment of the present disclosure.

Referring to FIG. 13, the memory system 110 can include a controller 130 and a memory device 150. The memory device 150 can include the plurality of memory blocks 292, 294 or the plurality of memory blocks 152, 154, 156 described with reference to FIGS. 1 to 2.

The controller 130 can include a flash translation layer (FTL) 240 and a host check module 262. Referring to FIGS. 1 to 4, the flash translation layer (FTL) 240 can determine a location to store host data, input from the host 102, in the memory device 150, and generate metadata including map data or map information associated with the stored data. The controller 130 including the flash translation layer (FTL) 240 can transmit the host data and the metadata to the memory device 150.

The flash translation layer (FTL) 240 can generate a program command associated with the host data or the metadata to be stored in the memory device 150. The host check module 262 can add an identifier or a key value into the program command generated by the flash conversion layer (FTL) 240. For example, the identifier or key value attached to the program command for storing the host data in the memory device 150 can be set to '1'. On the other hand, the identifier or key value attached to the program command for storing the metadata in the memory device 150 can be set to '0'.

When the identifier or key value included in the program command is set, the memory device 150 can recognize whether write data transmitted along with the program command is metadata or host data. In an embodiment where the metadata bypass module 278, the die blocking module 272, and/or the metadata pending module 276 is arranged between the flash translation layer (FTL) 240 and the memory device 150, the metadata bypass module 278, the die blocking module 272, or the metadata pending module 276 can check the identifier or key value added to the program command to determine whether the program command transferred to the memory device 150 relates to the metadata or the host data.

Figure 14:
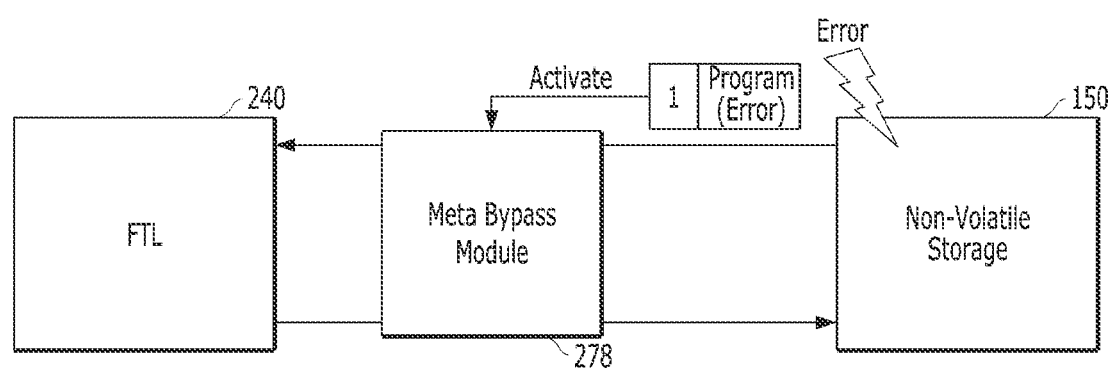
FIG. 14 illustrates a second example of a memory system according to another embodiment of the present disclosure.

FIG. 14 illustrates a second example of a memory system according to another embodiment of the present disclosure.

Referring to FIG. 14, the metadata passing module 278 can be disposed between the flash translation layer (FTL) 240 and the memory device 150 in the memory system 110.

When an error occurs in the memory device 150, the memory device 150 can notify information about the error to the metadata bypass module 278. The memory device 150 can transmit a response regarding a program command in which an error has occurred to the flash translation layer 240. Further, the memory device 150 can add an identifier to the response corresponding to the program command associated with occurred error. The metadata bypass module 278 can be activated based on the identifier transmitted from the memory device 150. For example, when the memory device 150 transmits a response regarding the program command associated with the occurred error to the flash translation layer 240, the identifier appended to the corresponding program command is set as '1'. When the identifier is '1', the metadata bypass module 278 could be activated.

Based on the identifier, the metadata bypass module 278 can determine whether to transmit the metadata to the memory device 150. The memory device 150 can set the identifier according to whether the metadata can be programmed in a process of correcting or recovering an error which occurred therein. According to an embodiment, while the memory device 150 performs a data input/output operation (e.g., a read operation, a write operation, etc.) to correct or recover the error, the identifier can be set to '1'. When the identifier is '1', the metadata can be allowed to be transmitted to the memory device 150 but the host data might not be allowed to be transmitted to the memory device 150. On the other hand, when the identifier is '0', the metadata bypass module 278 can be deactivated. When the metadata bypass module 278 is deactivated, the metadata bypass module 278 can allow the host data as well as the meta data to be transferred to the memory device 150.

Figure 15:
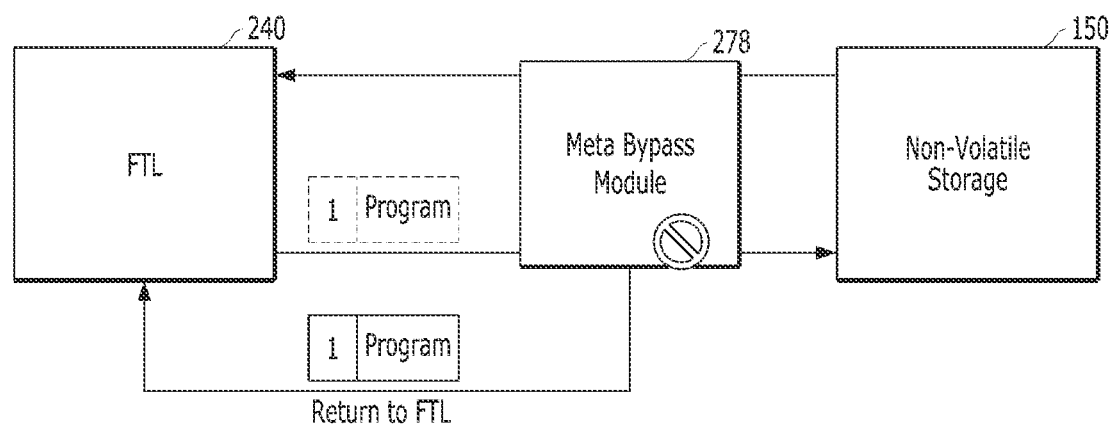
FIG. 15 illustrates a third example of a memory system according to another embodiment of the present disclosure.
Figure 15:
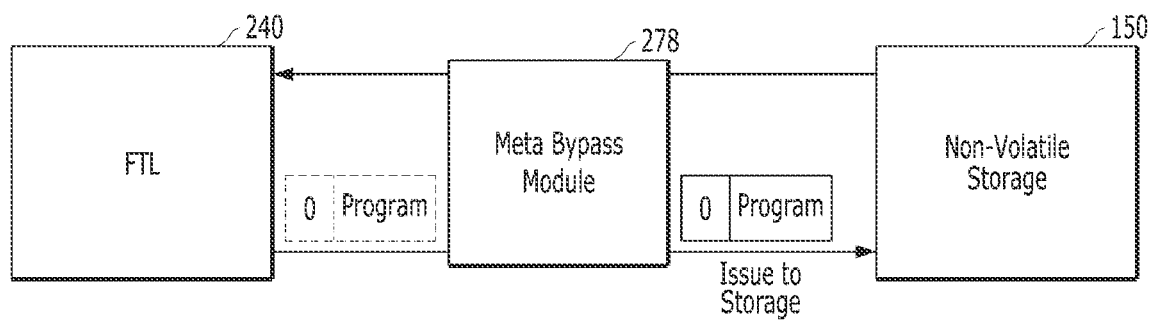

FIG. 15 illustrates a third example of a memory system according to another embodiment of the present disclosure.

Referring to FIG. 15, an operation when the metadata bypass module 278 included in the memory system 110 is activated will be described.

Referring to FIG. 15, a program command transmitted from the flash translation layer (FTL) 240 to the memory device 150 can include an identifier or key value. For example, the identifier or key value included in the program command for storing host data in the memory device 150 is set to '1'. The identifier or key value included in the program command for storing metadata in the memory device 150 can be set to '0'.

The metadata bypass module 278 can be activated when the identifier of the program command is '1'. The metadata bypass module 278 can return the corresponding program command to the flash translation layer (FTL) 240 (Return to FTL). On the other hand, when the identifier of the program command is '0', the metadata bypass module 278 can transfer the corresponding program command to the memory device 150 (Issue to Storage).

Figure 16:
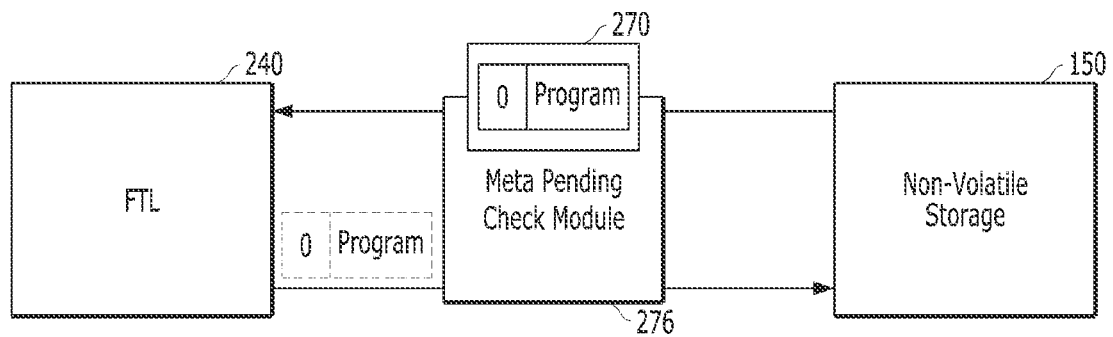
FIG. 16 illustrates a fourth example of a memory system according to another embodiment of the present disclosure.
Figure 16:
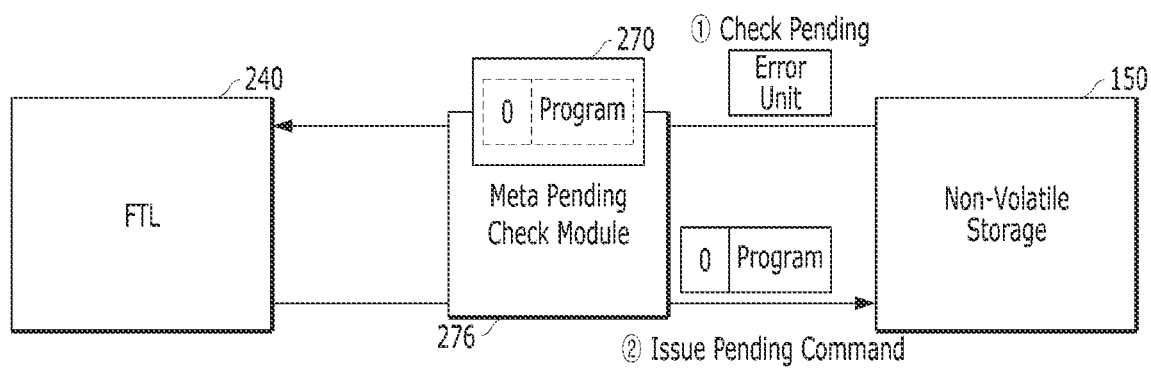

FIG. 16 illustrates a fourth example of a memory system according to another embodiment of the present disclosure.

Referring to FIG. 16, the metadata pending module 276 can be disposed between the flash translation layer (FTL) 240 and the memory device 150 in the memory system 110. A program command 270 for storing metadata in the memory device 150 can be transmitted from the flash translation layer (FTL) 240 to the metadata pending module 276. In this case, because the program command 270 relates to the metadata, an identifier included in the program command 270 can be set to '0'.

The metadata pending module 276 can temporarily store the program command 270 and the metadata in a buffer. Thereafter, the metadata pending module 276 can check whether an error check, correction, or recovery operation is performed in the memory device 150 (TD Check Pending). Herein, the error check, correction, or recovery operation can individually or independently be performed at specific memory regions included in the memory device 150. The memory region involved for the error check, correction, or recovery operation can vary corresponding to a type of the error, a size of the error, and a location where the error occurred. When the error check, correction, or recovery operation is terminated at each memory region in the memory device 150, the metadata pending module 276 can transfer the program command 270 and the metadata temporarily stored in the buffer to each memory region in the memory device 150 (② Issue Pending Command). The memory device 150 can receive the program command 270 and the metadata to program the metadata at a preset location or an arbitrary location.

Figure 17:
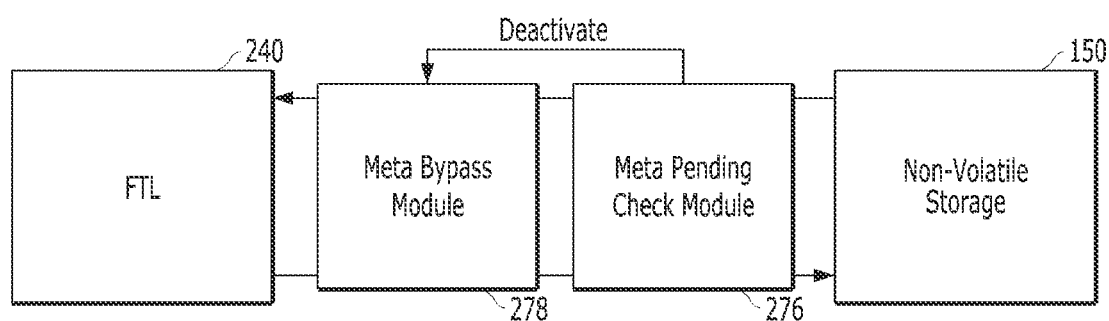
FIG. 17 illustrates a fifth example of a memory system according to another embodiment of the present disclosure.

FIG. 17 illustrates a fifth example of a memory system according to another embodiment of the present disclosure.

Referring to FIG. 17, the metadata bypass module 278 and the metadata pending module 276 can be included between the flash translation layer (FTL) 240 and the memory device 150 in the memory system 110.

The metadata pending module 276 can check the error check, correction, or recovery operation performed at each memory region in the memory device 150, and monitor whether the error check, correction, or recovery operation performed at each memory region in the memory device 150 is terminated. The metadata pending module 276 can deactivate the metadata bypass module 278 for each memory region when the error check, correction, or recovery operation is terminated at each memory region. When the metadata bypass module 278 is deactivated, at least one of the host data or the metadata can be sequentially transferred to the memory device 150.

As above described, a memory system or data processing system according to an embodiment of the present disclosure can reduce or avoid delay in a program operation due to an error in a non-volatile memory device supporting a namespace divided by zone.

In addition, the memory system according to an embodiment of the present disclosure can store host data corresponding to a namespace divided by zones in a memory device including a memory die that does not include a write cache, so that a speed of the program operation regarding host data could be improved.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, control circuitry, devices, modules, units, multiplexers, logic, interfaces, decoders, drivers, generators and other signal generating and signal processing features of the embodiments disclosed herein may be implemented, for example, in non-transitory logic that may include hardware, software, or both. When implemented at least partially in hardware, the controllers, processors, control circuitry, devices, modules, units, multiplexers, logic, interfaces, decoders, drivers, generators and other signal generating and signal processing features may be, for example, any of a variety of integrated circuits including but not limited to an application-specific integrated circuit, a field-programmable gate array, a combination of logic gates, a system-on-chip, a microprocessor, or another type of processing or control circuit.

When implemented at least partially in software, the controllers, processors, control circuitry, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

While the present teachings have been illustrated and described with respect to specific embodiments, it will be apparent to those skilled in the art in light of the present disclosure that various changes and modifications may be made without departing from the spirit and scope of the disclosure as defined in the following claims. Furthermore, the embodiments may be combined to form additional embodiments.

What is claimed is:

1. A memory system, comprising:
a memory device including at least one storage region; and
a controller configured to:
separate write data input from an external device from metadata associated with data stored in the memory device;
either store, based on an operation state of the at least one storage region, the write data into a buffer which is configured to store data to be transferred to the at least one storage region in the memory device, or store the metadata into the buffer regardless of the operation state of the at least one storage region; and
transfer the write data or the metadata stored in the buffer to the memory device for storing the write data or the metadata in the memory device,
wherein the controller comprises:
flash translation circuitry configured to check the at least one storage region in which the write data is stored and generate metadata associated with the write data; and
metadata bypass circuitry configured to determine transmission of the write data or the metadata to the at least one storage region based on an error which occurred in the at least one storage region,
wherein the memory system further comprises error handling circuitry configured to recover, when the error occurs in the at least one storage region, the error and control storing the transferred metadata in the at least one storage region after the error is recovered, and
wherein the metadata bypass circuitry is configured to obstruct the write data to be transferred to the at least one storage region and allow transmission of the metadata, when the error handling circuitry detects the error occurred in the at least one storage region.

2. The memory system according to claim 1, wherein the at least one storage region is allocated for a zoned namespace.

3. The memory system according to claim 2, wherein the error handling circuitry is included in the at least one storage region, and
wherein the at least one storage region includes at least one memory die.

4. The memory system according to claim 2, wherein the error handling circuitry is included in the controller, and
wherein the at least one storage region includes at least one memory block.

5. The memory system according to claim 2, wherein the metadata bypass circuitry comprises:
first circuitry configured to obstruct the write data and the metadata to be transferred to the at least one storage region when the error handling circuitry detects the error occurred in the at least one storage region; and
second circuitry configured to allow the metadata to bypass the first circuitry while the error is recovered.

6. The memory system according to claim 5, wherein the controller further comprises metadata pending circuitry configured to await transmission of the metadata from the buffer to the at least one storage region while the error handling circuitry recovers the error in the at least one storage region.

7. The memory system according to claim 5, wherein the flash translation circuitry is further configured to attach different identifiers to a first command for programming the write data in the memory device and a second command for programming the metadata in the memory device.

8. The memory system according to claim 1, wherein the controller is further configured to control the memory device to sequentially the write data in a storage region included in the memory device, the storage region allocated for a zoned namespace corresponding to a logical address associated with the write data, and
wherein the buffer is arranged corresponding to a memory die or a memory plane including the at least one storage region.

9. The memory system according to claim 1, wherein the controller is further configured to:
generate metadata associated with the write data stored in the at least one storage region, and
control the memory device to store the metadata in another storage region included in the memory device.

10. A method for operating a memory system, comprising:
separating write data input from an external device from metadata associated with data stored in a memory device including at least one storage region;
either storing, based on an operation state of the at least one storage region, the write data into a buffer which is configured to store data to be transferred to the at least one storage region in the memory device, or storing the metadata into the buffer regardless of the operation state of the at least one storage region;
transferring the write data or the metadata stored in the buffer to the memory device; and
programming the transferred write data or the transferred metadata in the at least one storage region of the memory device,
wherein the method further comprising:
allocating the at least one storage region for a zoned namespace; and
recovering, when an error occurs in the at least one storage region, the error to program the transferred metadata in the at least one storage region after the error is recovered, and
wherein the storing of either the write data or the metadata comprises:
checking the operation state of the at least one storage region; and
obstructing the write data and the metadata to be stored into the buffer when the error occurs in the at least one storage region; and
storing the obstructed metadata into the buffer while the error is recovered.

11. The method according to claim 10, further comprising awaiting transmission of the metadata from the buffer to the at least one storage region while the error is recovered.

12. The method according to claim 10, further comprising attaching different identifiers to a first command for programming the write data in the memory device and a second command for programming the metadata in the memory device.

13. The method according to claim 10, further comprising generating metadata associated with the write data stored in the at least one storage region after checking the at least one storage region.

14. The method according to claim 10, wherein the programming of the transferred write data includes sequentially programming the transferred write data in the at least one storage region allocated for a zoned namespace corresponding to a logical address associated with the write data.

15. The method according to claim 10, further comprising generating metadata associated with the write data stored in the at least one storage region,
   wherein the transferred metadata and the transferred write data are programmed in different storage regions included in the memory device.

16. A memory system, comprising:
   a memory device including plural memory blocks or plural memory dies; and
   a controller configured to:
   allocate the plural memory blocks or the plural memory dies for plural zones;
   receive write data and a logical address associated with the write data from a host;
   either store the write data into a buffer assigned to at least one memory block or at least one memory die allocated for a zone, which corresponds to the logical address among the plural zones, based on whether an error occurs in the at least one memory block or the at least one memory die, or store metadata into the buffer regardless of the error;
   transfer the write data or the metadata stored in the buffer to the memory device; and
   control the memory device to store the transferred write data or the transferred metadata in the plural memory blocks or the plural memory dies.

17. The memory system according to claim 16, wherein the controller stores the transferred write data and the transferred metadata by
   sequentially programming the transferred write data in the memory device based on the logical address, and
   programming the transferred metadata at a preset location in the memory device regardless of the write data or the logical address.

* * * * *